(12) United States Patent
Kikuchi et al.

(10) Patent No.: US 6,181,498 B1
(45) Date of Patent: Jan. 30, 2001

(54) RECORDING AND REPRODUCING APPARATUS, INFORMATION SIGNAL RECORDING AND REPRODUCING SYSTEM AND METHOD OF MANAGING INVALID AREA INFORMATION

(75) Inventors: Akihiro Kikuchi, Kanagawa; Teruyuki Miyakawa, Tokyo, both of (JP)

(73) Assignee: Sony Corporation, Tokyo (JP)

( * ) Notice: Under 35 U.S.C. 154(b), the term of this patent shall be extended for 0 days.

(21) Appl. No.: 08/375,850

(22) Filed: Jan. 20, 1995

(30) Foreign Application Priority Data

Jan. 20, 1994 (JP) .................................................. 6-004696

(51) Int. Cl.[7] .................................................. G11B 5/09
(52) U.S. Cl. ................................ 360/53; 360/48; 714/723
(58) Field of Search ................................ 360/40, 48, 53; 371/21.6; 395/185.07; 714/723

(56) References Cited

U.S. PATENT DOCUMENTS

| 3,932,894 | 1/1976 | Arter et al. ........................... 360/134 |
| 4,011,587 | 3/1977 | Arter et al. ........................... 360/62 |
| 4,298,897 | 11/1981 | Arter et al. ........................... 360/39 |
| 4,652,940 | 3/1987 | Sumiyoshi ........................... 360/5 |
| 5,258,852 | * 11/1993 | Kamijima ........................... 360/53 X |
| 5,274,513 | 12/1993 | Nakano et al. ........................ 360/72.2 |
| 5,294,949 | 3/1994 | Robison et al. ........................ 354/106 |
| 5,313,341 | * 5/1994 | Okihara et al. ........................ 360/48 |
| 5,325,370 | 6/1994 | Cleveland et al. .................... 371/37.4 |
| 5,327,305 | 7/1994 | Thomas .................................. 360/74.5 |
| 5,341,251 | 8/1994 | Fincher et al ........................... 360/49 |
| 5,341,378 | 8/1994 | Shih ........................................ 371/2.2 |
| 5,388,016 | 2/1995 | Kanai et al. ........................... 360/72.1 |
| 5,408,366 | * 4/1995 | Bentley et al. ......................... 360/53 |
| 5,525,902 | * 6/1996 | Nakajima et al. ................... 360/72.1 |

FOREIGN PATENT DOCUMENTS 5-128807   5/1993   (JP) .

\* cited by examiner

*Primary Examiner*—Nabil Hindi
*Assistant Examiner*—Regina Y. Neal
(74) *Attorney, Agent, or Firm*—Frommer Lawrence & Haug, LLP.; William S. Frommer; Gordon Kessler

(57) ABSTRACT

If a BS (bad spot) occurs when data is written, then BST (bad spot table) is updated and registered in an EOD (end of data), thereby making it possible to carry out a recovery operation with ease in a short period of time. A data recorder for recording a DIT (directory information table) on a tape includes a data recorder body (65), a memory means (12) for temporarily memorizing the BST, a write state detecting means (17) for detecting occurrence of BS and a main control circuit (53M) serving as a control means for updating the BST each time BS occurs and controlling the data recorder (65) such that the data recorder (65) records updated DIT of at least the BST on a predetermined position of the tape when the tape is unloaded from the data recorder (65).

10 Claims, 40 Drawing Sheets

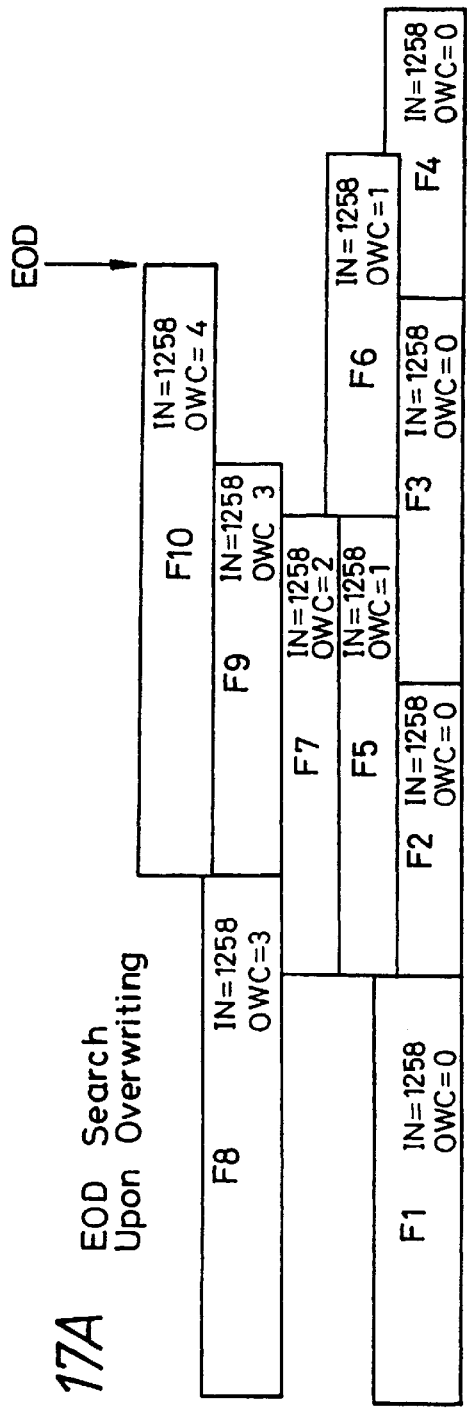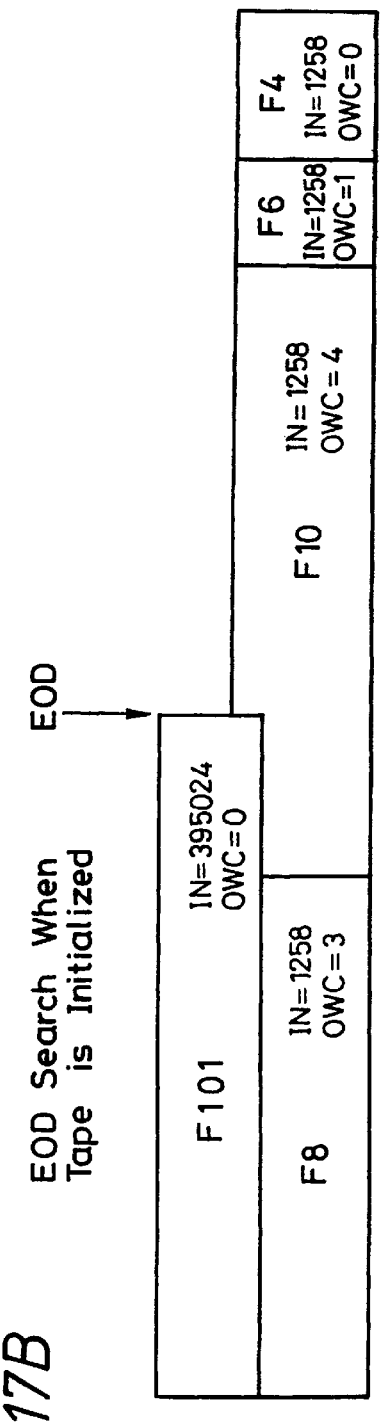
FIG. 17A  EOD Search Upon Overwriting
FIG. 17B  EOD Search When Tape is Initialized

| Word | MSB Byte 3 | Byte 2 | Byte 1 | Byte 0 LSB |
|---|---|---|---|---|
| 0 | Reserved and shall be recorded with (0)h | | | |
| ... | ... | | | |
| 43 | Reserved and shall be recorded with (0)h | | | |
| 44 | Physical Track set ID of the first data block in this physical volume | | | |
| 45 | Physical Track set ID of the last data block in this physical volume | | | |
| 46 | Reserved and shall be recorded with (0)h | | | |
| ... | ... | | | |
| 61 | Reserved and shall be recorded with (0)h | | | |
| 62 | Number of VIT entries that follow | | | |
| 63 | Reserved and shall be recorded with (0)h | | | |
| 64 | Reserved and shall be recorded with (0)h | | | |
| 65 | Physical track set ID of VIT #1 | | | |
| 66 | Reserved and shall be recorded with (0)h | | | |
| ... | ... | | | |
| 8191 | Reserved and shall be recorded with (0)h | | | |

FIG. 21

| Word | Byte 3 MSB | Byte 2 | Byte 1 | Byte 0 LSB |
|---|---|---|---|---|
| W0 | | VSIT identification | | |
| W1 | | Byte count in track | | |
| W2 | B | Track number in this block | | |
| W3 | | All 1 s | | |
| W4 | | All 1 s | | |
| W5 | | All 1 s | | |
| W6 | A | Logical track set ID (increment) | | |
| W7 | | Reserved and shall be recorded with 0 16 | | |
| W8 | | Reserved and shall be recorded with 0 16 | | |
| ... | | ... | | |
| W23 | | Reserved and shall be recorded with 0 16 | | |
| W24 | | Check SUM | | |

FIG. 22

| Word | MSB Byte 3 | Byte 2 | Byte 1 | Byte 0 LSB |
|---|---|---|---|---|
| W0 | | Dummy identification | | |
| W1 | | All 0 s | | |
| W2 | B | Track number in this block | | |
| W3 | | All 1 s | | |
| W4 | | All 1 s | | |
| W5 | | All 1 s | | |
| W6 | A | Logical track set ID (Not increment) | | |
| W7 | W | Write retry count | | |
| W8 | | Reserved and shall be recorded with $0_{16}$ | | |
| ... | | ... | | |
| W23 | | Reserved and shall be recorded with $0_{16}$ | | |
| W24 | | Check SUM | | |

FIG. 23

| Word | Byte 3 MSB | Byte 2 | Byte 1 | Byte 0 LSB |
|---|---|---|---|---|
| W0 | | EOD identification | | |
| W1 | | Byte count in track | | |
| W2 | B | Track number in this block | | |
| W3 | | All 1 s | | |
| W4 | | All 1 s | | |
| W5 | | All 1 s | | |
| W6 | A | Logical track set ID (Not increment) | | |
| W7 | W | Write retry count | | |
| W8 | | Reserved and shall be recorded with 0₁₆ | | |
| ... | | ... | | |
| W23 | | Reserved and shall be recorded with 0₁₆ | | |
| W24 | | Check SUM | | |

FIG. 24

| Word | Item | Meaning | Operation | Initial Value | Initialize Condition |
|---|---|---|---|---|---|
| W1 | Byte count in track | Byte count in track | Recorded With "0" | | |
| W2 | Track number in the belonging Block | Track number in the belonging Block | All "1"s | 0 | |
| W3 | Absolute Block Number | Absolute Block Number | All "1"s | All 1s | |
| W4 | Block number in the belonging file | Block number in the belonging file | All "1"s | All 1s | |
| W5 | file number | file number | Not Incremented | All 1s | Initialize by first Block following dit or tape mark |
| W6 | Logical track set ID number | Logical track set ID number | Increment data each time same data is processed by write retry | by Increment | Set data having sub code of first logical track set ID |
| W7 | Write retry count | Write retry count | Recorded With "0" | 0 | |
| W8 ~ W23 | Reserved | Reserved word | Calculation range of checksum: from w0 to W23 | 0 | |
| W24 | Check SUM | Check SUM | | | |

FIG. 25

| Word | MSB Byte 3 | Byte2 | Byte1 | Byte0 LSB |
|---|---|---|---|---|
| 0 | Reserved and shall be recorded with (0)h | | | |
| 1 | Reserved and shall be recorded with (0)h | | | |
| 2 | Reserved and shall be recorded with (0)h | | | |
| 3 | Reserved and shall be recorded with (0)h | | | |
| 4 | Volume Label, byte 0-3 | | | |
| 5 | Volume Label, byte 4-7 | | | |
| ... | ... | | | |
| 42 | Volume Label, byte 152-155 | | | |
| 43 | Volume Label, byte 156-159 | | | |
| 44 | Track set ID of the first data block in this volume segment on this physical volume | | | |
| 45 | Track set ID of the last data block in this volume segment on this physical volume | | | |
| 46 | Reserved and shall be recorded with (0)h | | | |
| ... | ... | | | |
| 61 | Reserved and shall be recorded with (0)h | | | |

FIG. 26

| Word | MSB Byte 3 | Byte2 | Byte1 | Byte0 LSB |
|---|---|---|---|---|
| 62 | | Number of entries in File Information Table | | |
| 63 | | Number of track sets in File Information Table | | |
| 64 | | UIT Table type | | |
| 65 | | Reserved and shall be recorded with (0)h | | |
| ... | | ... | | |
| 255 | | Overwrite count | | |
| 256 | | Initialize number | | |
| 257 | | Reserved and shall be recorded with (0)h | | |
| 258 | | Reserved and shall be recorded with (0)h | | |
| 259 | | Reserved and shall be recorded with (0)h | | |
| 260 | | Reserved and shall be recorded with (0)h | | |
| ... | | ... | | |
| 8191 | | Reserved and shall be recorded with (0)h | | |

FIG. 27

| Word | MSB Byte 3 | Byte 2 | Byte 1 | Byte 0 LSB |
|---|---|---|---|---|
| W0 | | VIT identification | | |
| W1 | | Byte count in track | | |
| W2 | B | Track number in this block | | |
| W3 | | All 1 s | | |
| W4 | | All 1 s | | |
| W5 | | All 1 s | | |
| W6 | A | Logical track set ID (increment) | | |
| W7 | | Reserved and shall be recorded with 0 16 | | |
| W8 | | Reserved and shall be recorded with 0 16 | | |
| ... | | ... | | |
| W23 | | Reserved and shall be recorded with 0 16 | | |
| W24 | | Check SUM | | |

FIG. 28

| WORD | MSB<br>Byte 3 | Byte2 | Byte1 | Byte0 LSB |
|---|---|---|---|---|
| 8192 | E | #1 badspot start track set ID ( physical ) | | |
| 8193 | | #1 badspot end track set ID ( physical ) | | |
| 8194 | E | #2 badspot start track set ID ( physical ) | | |
| 8195 | | #2 badspot end track set ID ( physical ) | | |
| 8196 | E | #3 badspot start track set ID ( physical ) | | |
| ... | | ... | | |
| 2N+8190 | E | #N badspot start track set ID ( physical ) | | |
| 2N+8191 | | #N badspot end track set ID ( physical ) | | |

FIG. 29

1 TM absolute block number

| Word | MSB Byte 3 | Byte 2 | Byte 1 | Byte 0 LSB |
|---|---|---|---|---|
| 0 | | | | |
| 1 | #1 TM track set ID (physical) | | | |
| 2 | Reserved and shall be recorded with (0)h | | | |
| 3 | #2 TM track set ID (physical) | | | |
| ... | Reserved and shall be recorded with (0)h | | | |
| ... | ... | | | |
| 2N-2 | ... | | | |
| 2N-1 | #N TM track set ID (physical) | | | |
| | Reserved and shall be recorded with (0)h | | | |

FIG. 30

| Word | MSB Byte 3 | Byte 2 | Byte 1 | Byte 0 LSB |
|---|---|---|---|---|
| W0 | | FIT identification | | |
| W1 | | Byte count in track | | |
| W2 | B | Track number in this block | | |
| W3 | | All 1 s | | |
| W4 | | All 1 s | | |
| W5 | | All 1 s | | |
| W6 | A | Logical track set ID (increment) | | |
| W7 | | Reserved and shall be recorded with 0 16 | | |
| W8 | | Reserved and shall be recorded with 0 16 | | |
| ... | | ... | | |
| W23 | | Reserved and shall be recorded with 0 16 | | |
| W24 | | Check SUM | | |

FIG. 31

| Word | MSB Byte 3 | Byte 2 | Byte 1 | Byte 0 LSB |
|---|---|---|---|---|
| W0 | | UIT identification | | |
| W1 | | Byte count in track | | |
| W2 | B | Track number in this block | | |
| W3 | | All 1 s | | |
| W4 | | All 1 s | | |
| W5 | | All 1 s | | |
| W6 | A | Logical track set ID (increment) | | |
| W7 | | Reserved and shall be recorded with 0₁₆ | | |
| W8 | | Reserved and shall be recorded with 0₁₆ | | |
| ... | | ... | | |
| W23 | | Reserved and shall be recorded with 0₁₆ | | |
| W24 | | Check SUM | | |

FIG. 32

| Word | MSB Byte 3 | Byte2 | Byte1 | Byte0 LSB |
|---|---|---|---|---|
| W0 | Update status | | | |
| W1 | Reserved and shall be recorded with (0)h | | | |
| ... | Reserved and shall be recorded with (0)h | | | |
| W8191 | Reserved and shall be recorded with (0)h | | | |

FIG. 33

| Word | Byte 3 | Byte 2 | Byte 1 | Byte 0 |
|---|---|---|---|---|
| | MSB | | | LSB |
| W0 | | UT identification | | |
| W1 | | Byte count in track | | |
| W2 | B | Track number in this block | | |
| W3 | | All 1s | | |
| W4 | | All 1s | | |
| W5 | | All 1s | | |
| W6 | A | Logical track set ID (increment) | | |
| W7 | | Reserved and shall be recorded with $0_{16}$ | | |
| W8 | | Reserved and shall be recorded with $0_{16}$ | | |
| ... | | ... | | |
| W23 | | Reserved and shall be recorded with $0_{16}$ | | |
| W24 | | Check SUM | | |

FIG. 34

| Word | MSB<br>Byte 3 | Byte2 | Byte1 | Byte0<br>LSB |
|---|---|---|---|---|
| W0 | | CheckSUM data | | |
| W1 | Reserved and shall be recorded with (0)h | | | |
| ... | ... | | | |
| W8191 | Reserved and shall be recorded with (0)h | | | |

FIG. 35

| Word | MSB Byte 3 | Byte 2 | Byte 1 | Byte 0 LSB |
|---|---|---|---|---|
| W0 | | CheckSUM identification | | |
| W1 | | All 0 s | | |
| W2 | B | Track number in this block | | |
| W3 | | All 1 s | | |
| W4 | | All 1 s | | |
| W5 | | All 1 s | | |
| W6 | A | Logical track set ID (Not increment) | | |
| W7 | | Reserved and shall be recorded with $0_{16}$ | | |
| W8 | | Reserved and shall be recorded with $0_{16}$ | | |
| ... | | ... | | |
| W23 | | Reserved and shall be recorded with $0_{16}$ | | |
| W24 | | Check SUM | | |

FIG. 36

Table Area : VSIT, VIT, FIT, UT Track

| Word | Item | Meaning | Operation | Initial Value | Initialize Condition |
|---|---|---|---|---|---|
| W1 | Byte count in track | Byte count in track | Increment data at every track | 0 | Initialize at block boundary |
| W2 | Track number in the belonging Block | Track number in the belonging Block | All "1"s | All 1s | |
| W3 | Absolute Block Number | Absolute Block Number | All "1"s | All 1s | |
| W4 | Block number in the belonging file | Block number in the belonging file | All "1"s | All 1s | |
| W5 | file number | file number | Increment data at every track | by Increment | Initialize at the beginning of table area |
| W6 | Logical track set ID number | Logical track set ID number | Recorded With "0" | 0 | |
| W7~W23 | Reserved | Reserved | | | |
| W24 | Check SUM | Check SUM | Calculation range of checksum: from w0 to W23 | | |

FIG. 37

| Word | MSB Byte 3 | Byte 2 | Byte 1 | Byte 0 LSB |
|---|---|---|---|---|
| W0 | | User identification | | |
| W1 | | Byte count in track | | |
| W2 | B | Track number in this block | | |
| W3 | B | Absolute Block # | | |
| W4 | B | Block # in file | | |
| W5 | | File number | | |
| W6 | A | Logical track set ID (increment) | | |
| W7 | W | Write retry count | | |
| W8 | | Reserved and shall be recorded with 0 16 | | |
| W9 | | Reserved and shall be recorded with 0 16 | | |
| ... W22 | | Overwrite count | | |
| W23 | | Initialize number | | |
| W24 | | Check SUM | | |

FIG. 38

| Word | MSB Byte 3 | Byte 2 | Byte 1 | Byte 0 LSB |
|---|---|---|---|---|
| W0 | | TM identification | | |
| W1 | | All 0 s | | |
| W2 | B | Track number in this block | | |
| W3 | B | Absolute Block # | | |
| W4 | B | Block # in file | | |
| W5 | | File number | | |
| W6 | A | Logical track set ID (increment) | | |
| W7 | W | Write retry count | | |
| W8 | | Reserved and shall be recorded with 0 16 | | |
| ... | | ... | | |
| W23 | | Reserved and shall be recorded with 0 16 | | |
| W24 | | Check SUM | | |

FIG. 39

| Word | Table Track | | | | | Data Track | | | |
|------|------|------|------|------|------|------|------|------|------|
| | VSIT | VIT | FIT | UT | Checksum | USER | TM | EOD | DM |
| W0 | | | | | | | | | |
| W1 | Byte counter in track | | | | | | All 0 s | | All 0 s |
| W2 | Track number in this block | | | | | | | | |
| W3 | All 1 s | | | | | Absolute Block # | | All 1 s | |
| W4 | All 1 s | | | | | Block # in file | | All 1 s | |
| W5 | All 1 s | | | | | File number | | All 1 s | |
| W6 | Logical track set ID (increment) | | | | | (No increment) | | | |
| W7 | Reserved and shall be recorded with 0₁₆ | | | | | Write retry count | | | |
| W8 | Reserved and shall be recorded with 0₁₆ | | | | | Reserved and shall be recorded with 0₁₆ | | | |
| W9 | Reserved and shall be recorded with 0₁₆ | | | | | Reserved and shall be recorded with 0₁₆ | | | |
| ... | ... | | | | | | | | |
| W23 | Reserved and shall be recorded with 0₁₆ | | | | | | | | |
| W24 | Check SUM | | | | | Check SUM | | | |

Byte count in track

FIG. 40

Data Area: User Data and Tape Mark Track

| Word | Item | Meaning | Operation | Initial Value | Initialize Condition |
|---|---|---|---|---|---|
| W1 | Byte count in track | Byte count in track | Increment data at every track and not increment tape mark | | Initialize at block boundary |
| W2 | Track number in the belonging Block | Track number in the belonging Block | Increment data by data block and tape mark | 0 | Initialize at first block following DIT or tape mark |
| W3 | Absolute Block Number | Absolute Block Number | Increment data by data block and tape mark | 0 | Initialize at tape mark |
| W4 | Block number in the belonging file | Block number in the belonging file | Increment data by tape mark | 0 | Initialize at first block following DIT or tape mark |
| W5 | file number | file number | Increment data at every track set | 0 | Initialize at first Block following DIT or tape mark |
| W6 | Logical track set ID number | Logical track set ID number | Increment data each time same data is processed by write retry | by Increment | Set tape having subcode of first logical track set ID to 0 |
| W7 | Write retry count | Write retry count | Recorded With "0" | 0 | Initialized by physical volume |
| W8 | Reserved | Reserved area | Increment data at every overwriting | 0 | Store data in DIT |
| W22 | Over write count | Over write count | Generate different values in each initialization | 0 | Store data in DIT |
| W23 | Initialize number | Initialize number | Calculation range of checksum: from wo to W23 | Random number | |
| W24 | Check SUM | Check SUM | | | |

RECORDING AND REPRODUCING APPARATUS, INFORMATION SIGNAL RECORDING AND REPRODUCING SYSTEM AND METHOD OF MANAGING INVALID AREA INFORMATION

BACKGROUND OF THE INVENTION

The present invention relates to a recording and reproducing apparatus, an information signal recording and reproducing system and a method of managing invalid area information for use with a recording and reproducing system using a so-called data recorder as a storage apparatus in which data supplied from a host computer is digitally recorded on a recording medium and data digitally recorded on the recording medium is reproduced in response to a request from the host computer.

Digital data recorders (referred to hereinafter as "data recorders") have hitherto been known to digitally record information to be recorded, i.e., file data, such as document data, program data, image data and audio data used on a computer, on a magnetic tape so as to form helical tracks.

The simplest system employing the data recorder is arranged as follows. A host computer and an SCSI (small computer systems interface) formatter are connected via an SCSI interface, and the SCSI formatter and a data recorder are connected via an RS422 interface. The SCSI formatter is adapted to form a file format on a tape to exchange data on the file format.

The format used by the data recorder will be described below. A logical volume that is equivalent to one drive on a hard disk or the like, for example, is set on the tape. One volume is composed of volume information formed of position information of various data in the logical volume and directory information composed of information provided within a directory. The directory information is read out by the SCSI formatter when a tape cassette is loaded onto the data recorder and stored in a memory of the SCSI formatter. File data or the like supplied from the host computer is recorded behind the directory information.

The host computer issues a write command. Then, when file data (or a plurality of file data) is supplied to the SCSI formatter, the SCSI formatter sequentially accumulates file data supplied thereto in a buffer. When the host computer does not issue the next write command, the SCSI formatter adds data called EOD (end of data) to the last portion of data accumulated in the buffer and transfers the data stored in the buffer to the data recorder. The data recorder records data supplied thereto from the SCSI formatter on the tape so as to form slant tracks.

The EOD is information required by the SCSI formatter to recognize the status of recorded data and to control the data recorder based on such recognition when the shot computer issues the next command.

If the next command issued by the host computer is a write command, then when file data (or a plurality of file data) to be written next is stored in the buffer of the SCSI formatter, the SCSI formatter adds the EOD to the last portion of the data stored in the buffer and transfers the same to the data recorder. Simultaneously, the SCSI formatter sets the tape position of the data recorder to the position of the EOD recorded on the tape, whereby data supplied to the data recorder is sequentially recorded from the position of the EOD recorded on the tape. Accordingly, the previously-recorded EOD is erased by new data to be recorded next. Also, new EOD is added to the last portion of the new data, which as a result extends the USER area.

The SCSI formatter updates the directory information stored in the memory when data is written by the execution of write command. After the data is written, the directory information on the tape is updated by recording the directory information stored in the memory at the position where the directory information is recorded on the tape. Accordingly, when any command is supplied to the SCSI formatter from the host computer, the SCSI formatter constantly obtains accurate directory information on the tape by reading the updated directory information and can control the data recorder based on the accurate directory information.

U.S. Pat. No. 5,313,341 and Japanese laid-open patent publication No. 5-128807 describe the techniques relating to the above-mentioned recording and reproducing apparatus.

When the SCSI formatter records directory information on the tape of the tape cassette loaded onto the data recorder, if directory information cannot be updated because the supply of power to the data recorder and the SCSI formatter is stopped or because the data recorder and the SCSI formatter are failed, the tape cassette used at that time cannot be used any more.

The reason for this is that, although the directory structure on the tape is changed by the write operation, the directory information is not updated and hence information recorded on the tape cannot be accessed by the reference directory information.

When any accident occurs and the file format is troubled as described above, it is necessary to carry out a recovery operation to reconstruct a file format. In order to carry out the recovery operation, the SCSI formatter enables the data recorder to read the tape from its beginning to the end. Then, the SCSI formatter detects the directory structure on the tape by checking all resulting data. Thereafter, directory information has to be generated one more time based on the detected result. Therefore, the processing in the recovery operation becomes complex and takes plenty of time.

SUMMARY OF THE INVENTION

In view of the aforesaid aspect, it is an object of the present invention to provide a magnetic recording apparatus in which a recovery operation can be carried out in a short period of time with ease.

According to a first aspect of the present invention, there is provided a recording and reproducing apparatus for recording an information signal composed of at least data information and management information for managing the data information including at least invalid area information of a tape-shaped recording medium on the tape-shaped recording medium and reproducing the information signal from the tape-shaped recording medium. This recording and reproducing apparatus is comprised of recording and reproducing means for recording the information signal on the tape-shaped recording medium and reproducing the information signal from the tape-shaped recording medium, invalid area information memory means for temporarily memorizing the invalid area information reproduced from a predetermined position of the tape-shaped recording medium by the recording and reproducing means, invalid area detecting means for detecting an invalid area of the tape-shaped recording medium based on an information signal reproduced from the tape-shaped recording medium by the recording and reproducing means, invalid area information updating means for updating invalid area information memorized in the invalid area information memorizing means each time the invalid area is detected by the invalid area detecting means, and control means for controlling the recording and reproducing means such that the recording and reproducing means records end information including end position information representing a recording end position of the data information and the invalid area information memorized in the invalid area information memorizing means on the tape-shaped recording medium each time recording of the data information by the recording and reproducing means is interrupted and that the recording and reproducing means overwrites the management information in which at least the invalid area information is updated at the predetermined position of the tape-shaped recording medium when the tape-shaped recording medium is unloaded.

According to a second aspect of the present invention, there is provided an information signal recording and reproducing system which is comprised of a tape-shaped recording medium recording and reproducing apparatus for recording an information signal composed of data information and management information for managing the data information including at least invalid area information concerning an invalid area of the tape-shaped recording medium on the tape-shaped recording medium or reproducing the information signal from the tape-shaped recording medium and a data formatting apparatus for supplying the tape-shaped recording medium recording and reproducing apparatus with the information signal and a control signal for recording and reproducing the information signal. The tape-shaped recording medium recording and reproducing apparatus is comprised of recording and reproducing means for recording the information signal on the tape-shaped recording medium or reproducing the information signal from the tape-shaped recording medium, and invalid area detecting means for detecting an invalid area of the tape-shaped recording medium based on an information signal reproduced from the tape-shaped recording medium by the recording and reproducing means. The data formatting apparatus is comprised of invalid area information memory means for temporarily memorizing invalid area information reproduced from a predetermined position of the tape-shaped recording medium by the recording and reproducing means, invalid area information updating means for updating invalid area information memorized in the invalid area information memory means each time the invalid area is detected by the invalid area detecting means, and control means controls the recording and reproducing means such that the recording and reproducing means records end information including end position information representing a recording end position of the data information and invalid area information memorized in the invalid area information memory means on the tape-shaped recording medium each time recording of the data information by the recording and reproducing means is interrupted and that the recording and reproducing means overwrites the updated management information of at least the invalid area information on the predetermined position of the tape-shaped recording medium when the tape-shaped recording medium is unloaded.

According to a third aspect of the present invention, there is provided an invalid area information management method in a recording and reproducing apparatus which records information signal composed of data information and management information for managing the data information including at least invalid area information concerning an invalid area of a tape-shaped recording medium on the tape-shaped recording medium and reproduces the information signal from the tape-shaped recording medium. This invalid area information management method comprises the steps of reproducing the management information from a predetermined position of the tape-shaped recording medium when the tape-shaped recording medium is loaded, memorizing the invalid area information in the reproduced management information in an invalid area information memory means, recording the data information on the tape-shaped recording medium, reproducing the data information from the tape-shaped recording medium immediately after the data information is recorded, detecting an invalid area of the tape-shaped recording medium on the basis of a reproduced information signal, updating the invalid area information memorized in the invalid area information memory means each time said invalid area is detected, recording end information including end position information indicating a recording end position of the data information and the invalid area information memorized in the invalid area information memory means on the tape-shaped recording medium each time recording of the data information is interrupted, and overwriting the management information in which at least the invalid area information is updated on the predetermined position of the tape-shaped recording medium when the tape-shaped recording medium is unloaded.

BRIEF DESCRIPTION OF THE DRAWINGS

FIG. 17A is a schematic diagram used to explain EOD search operation upon overwrite according to the embodiment of the present invention;

FIG. 17B is a schematic diagram used to explain EOD each operation when a tape is initialized;

FIG. 19 is a diagram used to explain error correction according to the embodiment of the present invention;

FIG. 20 is a table used to explain a specific example of the VSIT according to the embodiment of the present invention;

FIG. 21 is a table used to explain a specific example of a subcode of the VSIT according to the embodiment of the present invention;

FIG. 22 is a table used to explain a specific example of a subcode of a dummy track according to the embodiment of the present invention;

FIG. 23 is a table used to explain a specific example of an EOD subcode according to the embodiment of the present invention;

FIG. 24 is a table used to explain a specific example of a parameter of subcode according to the embodiment of the present invention;

FIG. 25 is a table used to explain a specific example of a VIT of the DTF format according to the embodiment of the present invention;

FIG. 26 is a table used to explain a specific example of the VIT of the DTF format according to the embodiment of the present invention;

FIG. 27 is a table used to explain a specific example of a subcode of the VIT of the DTF format according to the embodiment of the present invention;

FIG. 28 is a table used to explain a specific example of bad spot according to the embodiment of the present invention;

FIG. 29 is a table used to explain a specific example of a file information table of the DTF format according to the embodiment of the present invention;

FIG. 30 is a table used to explain a specific example of a subcode of the file information table of the DTF format according to the embodiment of the present invention;

FIG. 31 is a table used to explain a specific example of a subcode of user information table according to the embodiment of the present invention;

FIG. 32 is a table used to explain a specific example of update table according to the embodiment of the present invention;

FIG. 33 is a table used to explain a specific example of a subcode of the update table according to the embodiment of the present invention;

FIG. 34 is a table used to explain a specific example of check sum data according to the embodiment of the present invention;

FIG. 35 is a table used to explain a specific example of check sum data according to the embodiment of the present invention;

FIG. 36 is a table used to explain a specific example of a parameter of a subcode according to the embodiment of the present invention;

FIG. 37 is a table used to explain a specific example of a subcode of USER data of the DTF format according to the embodiment of the present invention;

FIG. 38 is a table used to explain a specific example of a subcode of a tape mark of the DTF format according to the embodiment of the present invention;

FIG. 39 is a table used to explain the overall arrangement of the subcode according to the embodiment of the present invention; and FIG. 40 is a table used to explain a specific example of parameter of subcode according to the embodiment of the present invention.

DETAILED DESCRIPTION OF THE PREFERRED EMBODIMENT

Initially, a technique which assumes an embodiment of the present invention will be described below.

As formats used in the data recorder, there is known a DD-1 format (ANSI X385) according to the ANSI (American National Standards Institute) for data recording standards. The DD-1 format describes a data structure for file management for computer peripherals and an error-detection method for improving an error rate in detail.

The present invention uses a DTF (digital tape format) which is a recording format proposed and developed by the same assignee of the present application. The DTF can be realized on a data recorder suitable for a computer peripheral corresponding to the DD-1 format. In this example, a recovery operation can be facilitated according to the DTF.

Figure 1:
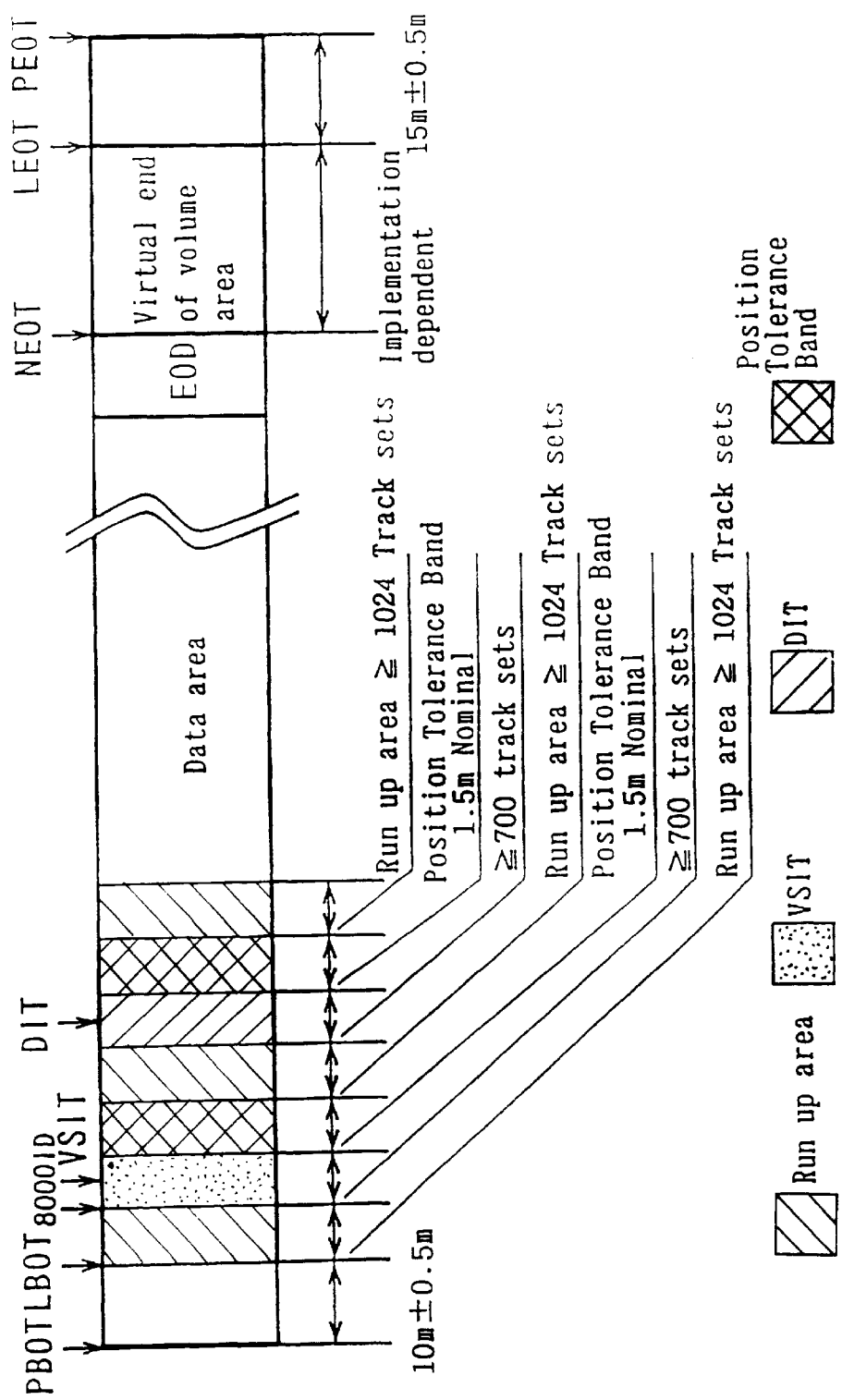
FIG. 1 is a block diagram showing a magnetic recording apparatus, an information signal recording and reproducing system and a method of managing invalid area information according to an embodiment of the present invention.

The DTF will be described with reference to FIGS. 1 through 5,

FIG. 1 of the accompanying drawings shows a logical data format on a magnetic tape formatted by the DTF. FIG. 1 conceptually shows a tape and various kinds of information composed of a plurality of helical tracks formed on the magnetic tape.

In FIG. 1, PBOT depicts a physical beginning of tape and LBOT depicts a logical beginning of tape. The PBOT and the LBOT are spaced apart by a physical length of 10 m±0.5 m according to the DTF. This spacing is provided in order to protect data recorded on the tape from being destroyed when the beginning of the tape tends to slacken or to be wrinkled.

Areas shown hatched are assigned to run up areas and are adapted to enable data to be reproduced after the tape running is stabilized.

Areas shown by dots are "VSIT" (volume set information table) areas. The VSIT is composed of logical volume information. An ID (identification data) having a value of "8000" is recorded on a track along its longitudinal direction corresponding to the beginning of the VSIT recording area.

The ID will be described below. In the DTF, the ID is recorded on the tape as a CTL (control data). The ID of which value is sequentially incremented from the beginning of the tape is sequentially recorded in the longitudinal direction of the tape. This ID is referred to as a physical track set ID (referred to hereinafter as "physical ID" for simplicity). The ID having the value of "8000" corresponds to the physical ID. The physical ID of the same value is assigned to four tracks. Specifically, the four tracks are grouped as one set and the physical ID of one value is assigned to one set.

When data is accessed, the physical ID is not used as it is and an ID provided within a partition set on the tape is used. This ID is referred to as "logical track set ID" (referred to hereinafter as "logical ID" for simplicity). The logical ID is an ID recorded on the tape as a helical track together with data when data is recorded. The logical ID of the same value is assigned to four tracks. Specifically, the four tracks are grouped as one set and the logical ID of one value is assigned to one set. In the above description, "partition" has a meaning similar to "drive" used when data is accessed by the host computer.

Let it be assumed that physical IDs ranging from 0 to 2999 are sequentially recorded on the tape and that three partitions are set on the tape. Then in this case, the first partition is composed of physical IDs ranging from "0" to "999". The second partition is composed of physical IDs ranging from "1000" to "1999". The third portion is composed of physical IDs ranging from "2000" to "2999". Each of the logical IDs ranges from "0" to "999". This is the feature of the logical ID.

The physical ID having the value of "8000" is the ID recorded on the beginning of the area in which the leading data (VSIT in this example) on the tape is recorded. There are at least two methods for recording the physical ID having the value of "8000" on the beginning of the area in which the VSIT is recorded.

According to the first method, the CTL is sequentially incremented from the position of PBOT. Then, a position at which the value of the CTL becomes "8000" is determined as the beginning of the VSIT recording area and the physical ID having the value "8000" is recorded on this position.

According to the second method, the physical ID having a value "0" is recorded at the position of the PBOT. Then, the physical ID which is incremented by "1" each at every four tracks is continuously recorded on corresponding areas until the value of the physical ID reaches "8000".

An area shown half tone in FIG. 1 represents a position tolerance band which is used as an area for absorbing an error in size of the run up area, the VSIT area and the DIT area. A width of this area in the longitudinal direction is determined to be 1.5 m.

An area shown in black represents a DIT (directory information table) recording area. The DIT is formed of directory information.

A data area is an area in which user data is recorded. As earlier noted, the EOD is information recorded on the area next to the area in which the user data is recorded. The EOD is information representing the state that user data is recorded up to the area just before the EOD.

A virtual end of volume area virtually represents a tape end portion. The virtual end of volume area depends on the state that data is recorded on each tape (i.e., implementation dependent).

An NEOT is an abbreviation of Near End Of Tape and represents the near end of the tape. An LEOT is an abbreviation of Logical End Of Tape and represents a logical end of tape. A PEOT is an abbreviation of Physical End Of Tape and represents a physical end of tape. The LEOT and the PEOT are physically spaced apart by a length of 15 m±0.5 m according to the DTF. This spacing is provided in order to protect data recorded on the tape from being destroyed if the data is recorded on the tape end portion because the tape end portion tends to slacken or to be wrinkled.

The sizes of the respective areas will be described in the order of values of IDs (physical ID or logical ID). As shown in FIG. 1, the run up area needs 1024 track set IDs or greater, the area shown dots in which the VSIT is recorded needs 700 track set IDs or greater, and the area shown black in which the DIT is recorded needs 700 track set IDs or greater. The VSIT and the DIT will be described more fully with reference to FIG. 20 and the following sheets of drawings.

The track format will be described next.

Figure 2:
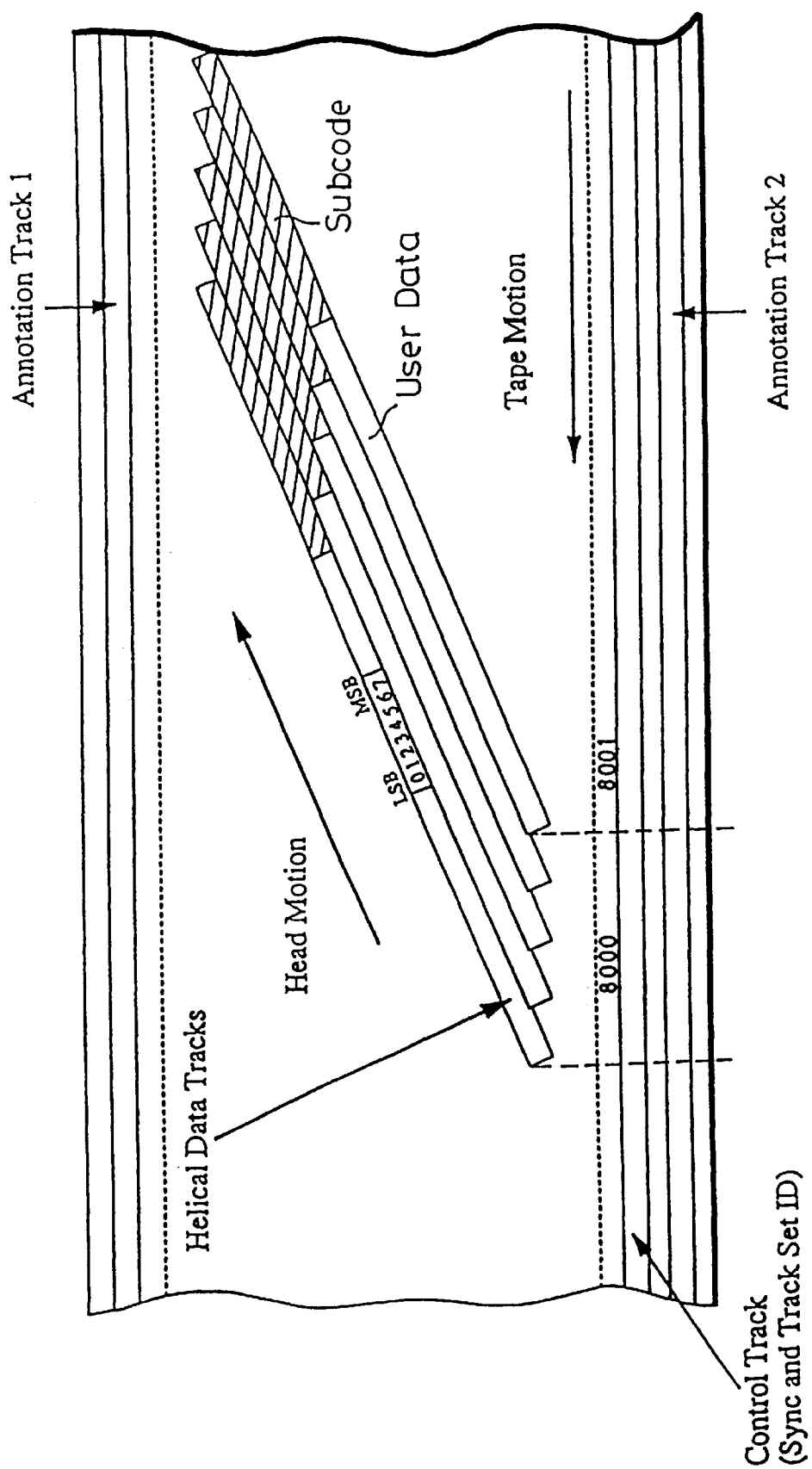
FIG. 2 is a schematic diagram used to explain a tape format according to the embodiment of the present invention.

FIG. 2 shows the track format on the tape according to the DTF (digital tape format). As shown in FIG. 2, when a rotary magnetic head of the data recorder traces a tape traveling with a tape motion shown by a solid arrow in a head motion shown by a solid arrow in the recording mode, helical data tracks are formed on the tape. The helical data track is composed of user data and subcode.

On the tape are formed an annotation track 1, and annotation track 2 and a control track. Upon recording, a stationary head (not shown) of the data recorder traces the tape along the longitudinal direction to record a sync (synchronizing) signal and a track set ID on the control track.

The track set ID corresponds to the above-mentioned physical ID and one track set ID is assigned to the four helical data tracks. A value of reference track set ID becomes "8000" and the track set ID is sequentially incremented at every four tracks.

Figure 3:
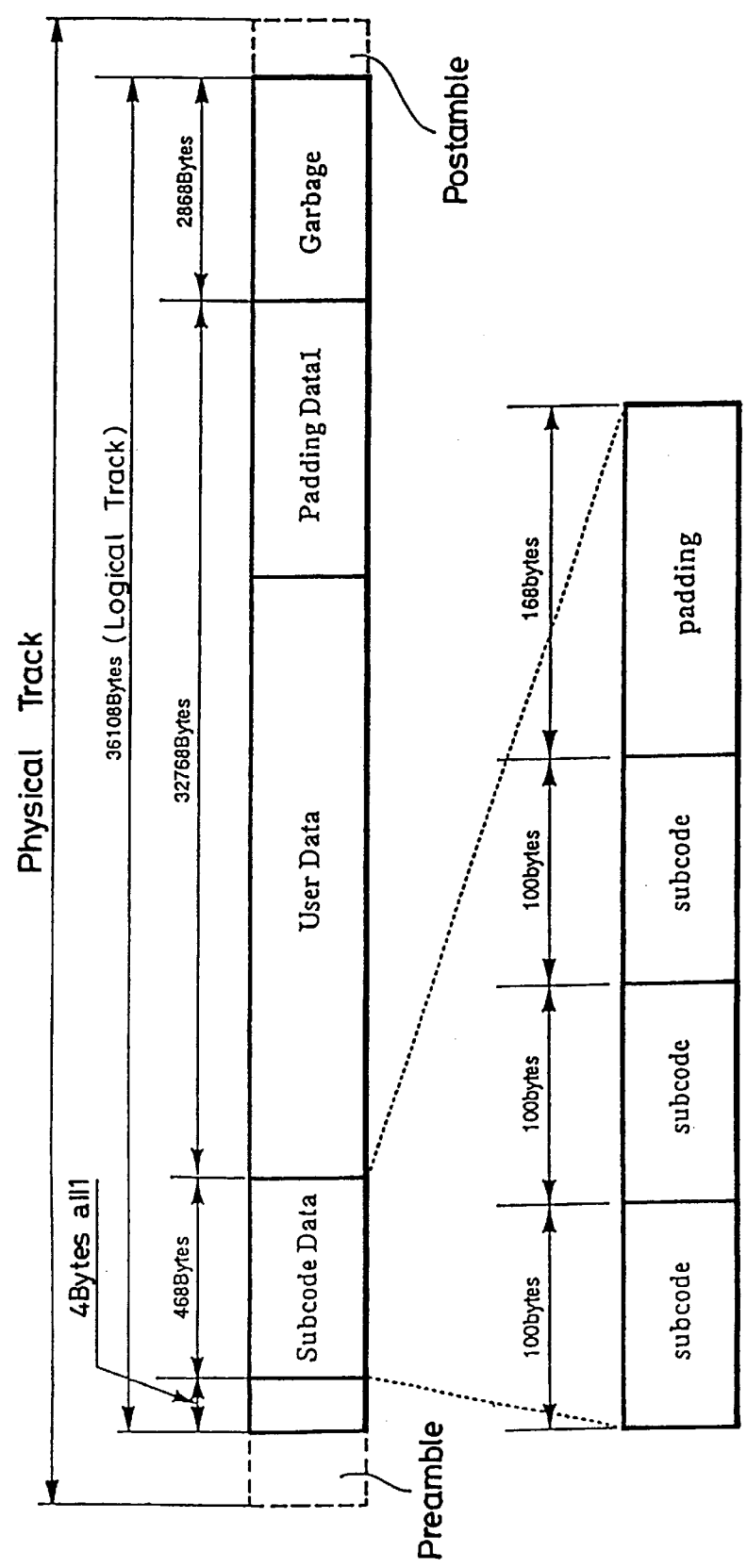
FIG. 3 is a schematic diagram used to explain a track format according to the embodiment of the present invention.

FIG. 3 is a schematic diagram used to explain the data structure of the helical data track shown in FIG. 2.

As shown in FIG. 3, in the helical data track shown in FIG. 2, the whole area including a preamble and a postamble is referred to as "physical track". A remaining area except the preamble and the postamble is referred to as "logical track". All data amount of the logical track becomes 36108 bytes.

The logical track is composed of first 4 bytes which are all "1"s (4 bytes are all 1s), subcode data of 468 bytes, user data and padding data 1 of 32768 bytes in total and garbage of 2868 bytes. The padding data 1 can be varied in length of area in response to the length of user data. The garbage area is an area which is not yet used.

The subcode data is composed of the three same data each composed of 100 bytes and padding data of 168 bytes. This padding data is used in order to achieve a similar object of the padding data 1.

Figure 4:
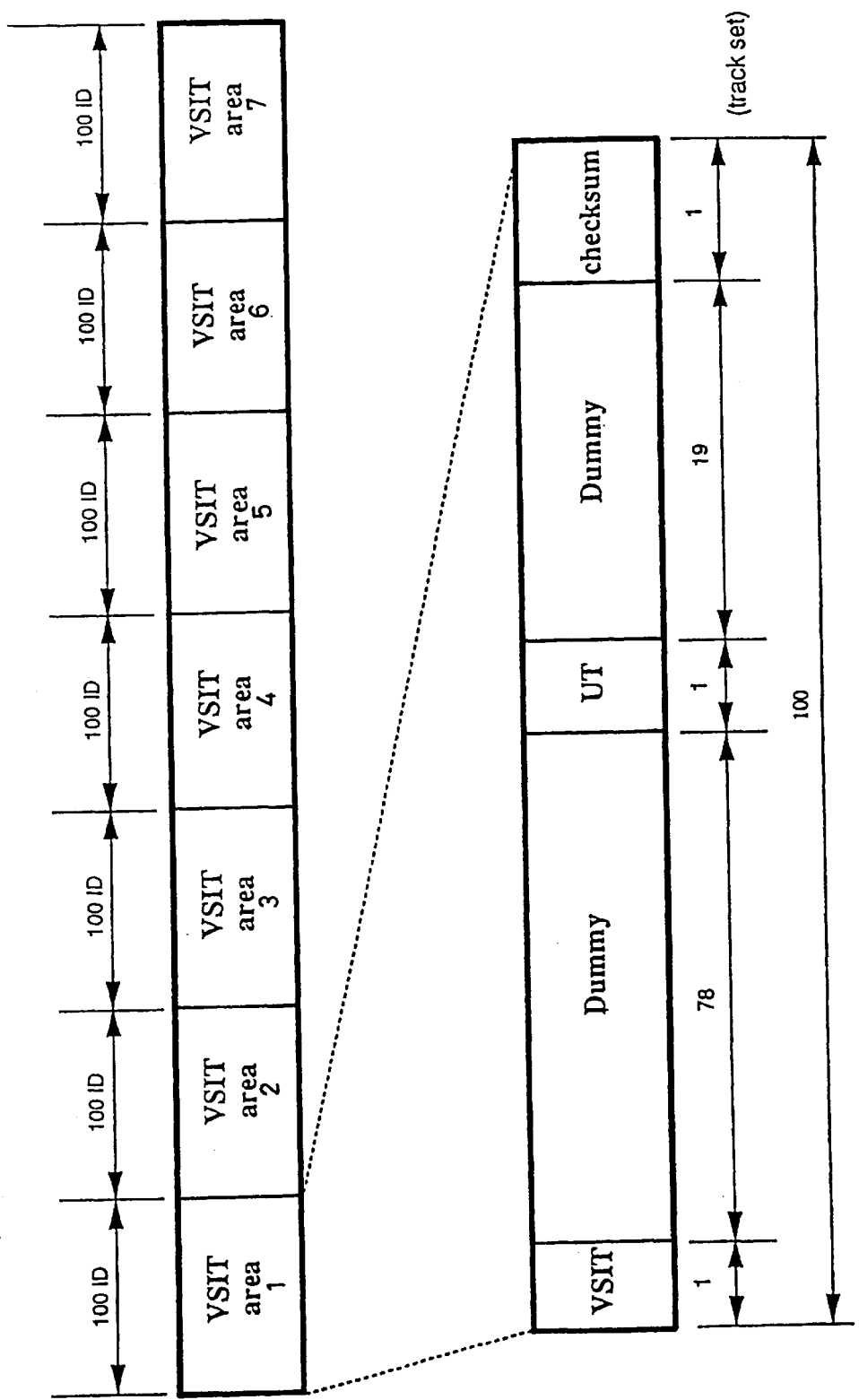
FIG. 4 is a schematic diagram used to explain a logical track format according to the embodiment of the present invention.

FIG. 4 is a schematic diagram showing VSIT recorded on the area shown dots in FIG. 1.

As shown in FIG. 4, the area shown dots in FIG. 1 is divided into seven areas of VSIT area 1 to VSIT area 7. Each of the VSIT area 1 to VSIT area 7 is composed of "100" IDs, i.e., 400 helical tracks and the same VSIT is recorded on each of the VSIT area 1 to the VSIT area 7.

The VSIT recorded on one VSIT area is composed of VSIT of "1" ID and Dummy data of "78" IDs, Dummy data of "19" IDs and UT (update table) of "1" ID as shown on the lower portion of FIG. 4.

The VSIT is ended by the EOD or the Dummy data. When the VSIT is ended by the Dummy data, it is regarded that the VSIT is ended by the Dummy data continued more than "16" IDs. When data is repeated as described above, the same data including the subcode is used except when a write retry counter, which will be described later on, is made effective.

The Dummy data is used to make accounts balance from a format standpoint. The UT is a flag representing that data is being recorded or that the recording is ended. When the UT is "ON", the UT shows that data is being recorded. When the UT is "OFF", the UT shows that the recording of data is ended. A checksum is an added result of the VSIT, the Dummy data, the UT and the Dummy data. It can be determined by the Checksum by comparing added result of the VSIT, the Dummy data, the UT and the Dummy data thus read out with check information (added result) whether or not the VSIT, the Dummy data, the UT and the Dummy data are correct. The VSIT, the Dummy data and the UT will be described more fully with reference to FIG. 20 and the following sheets of drawings.

Figure 5:
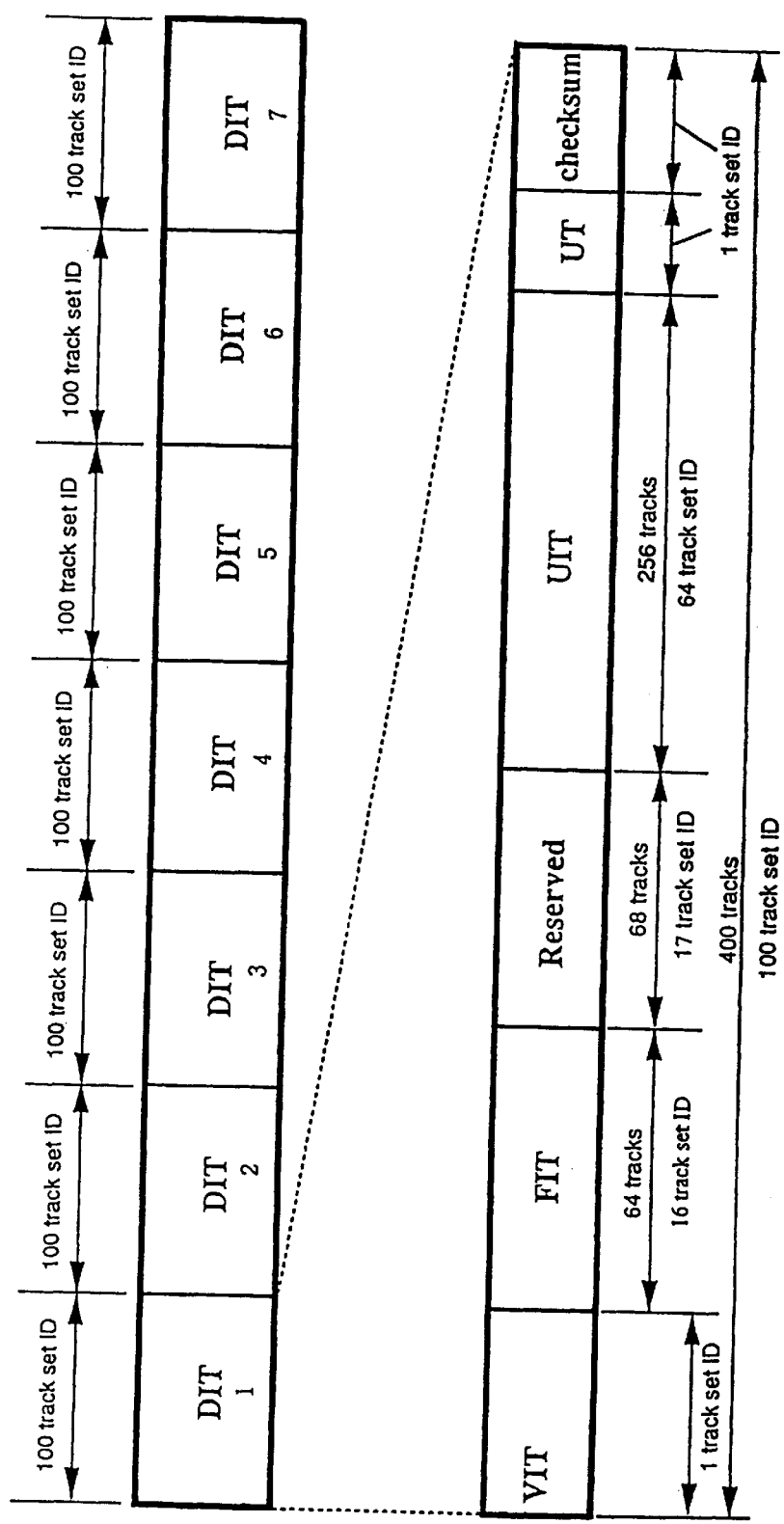
FIG. 5 is a schematic diagram used to explain an arrangement of a VSIT in a DTF format according to the embodiment of the present invention.

FIG. 5 is a schematic diagram used to explain the DIT recorded on the area shown black in FIG. 1.

As shown in FIG. 5, the area shown black in FIG. 1 is divided into seven areas of DIG areas DIT area 1 to DIT area 7. Each of the DIT area 1 to DIT area 7 is composed of "100" of IDs, i.e., 400 helical tracks and the same DIT is recorded on each area.

As shown in FIG. 5, one DIT area is composed of VIT (volume information table) of "1" ID, FIT (file information table) of "16" IDs, Reserved area of "17" IDs, UIT (user information table) of "64" IDs, UT (update table) of "1" ID and Checksum of "1" ID.

The VIT is formed of volume information and the FIT is formed of file information. The Reserved area represents a reserved area. The UIT is user information. The UT is a flag which represents that data is being recorded or that the recording of data is ended. When the UT is "ON" the UT shows that data is being recorded. When the UT is "OFF", the UT shows that the recording of data is ended. When the tape is loaded onto the data recorder, if the UT is placed in its "ON" state, then the SCSI formatter can recognize that the recording of data is unintentionally ended due to any reason.

When the UT is placed in its "ON", upon loading the tape, the previous recording of data was erroneously ended and, therefore, the DIT is not updated and the recording is ended. Accordingly, in this case, the SCSI formatter has to carry out the recovery operation in which the SCSI formatter reads out the whole of the tape, generates the DIT one more time and records the DIT thus generated on the tape, thereby making it possible to access the tape.

the Checksum is an added result of the VIT, the FIT, the Reserved area, the UIT and the UT. When the VIT, the FIT, the Reserved area, the UIT and the UT are read out, it can be determined by the Checksum by comparing the added result with information (added result) of the Checksum whether or not the VIT, the FIT, the Reserved area, the UIT and the UT are correct. The VIT, the FIT, the Reserved area, the UIT and the UT will be described more fully with reference to FIG. 20 and the following sheets of drawings.

The format which becomes a premise of the present invention has been summarized so far. The Data area shown in FIG. 1 will be described next. In the following description, let it be assumed that the host computer, the SCSI formatter and the data recorder are connected the apparatus. Fundamental operations of the host computer, the SCSI formatter and the data recorder were already described and therefore need not be described herein.

The Data area is composed of file data transferred from the host computer, a TM (tape mark) indicating a pause between file data and a BS (bad spot).

The BS (bad spot) will be described with reference to FIGS. 6A through 6E. FIGS. 6A through 6E are diagrams used to explain the BS.

Figure 6A:
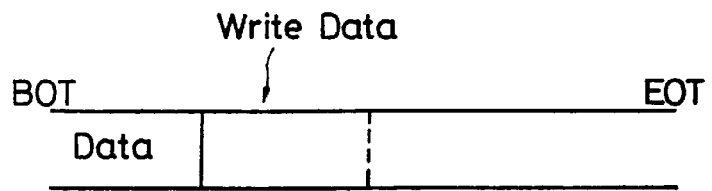
FIGS. 6A through 6E are schematic diagrams used to explain operation in the recording mode and the occurrence of bad spot (BS), respectively.
Figure 6B:
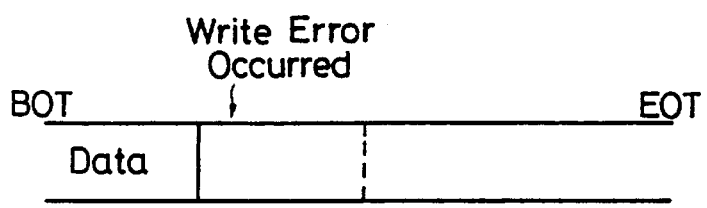

As shown in FIG. 6A, after having recorded data supplied thereto from the SCSI formatter on the tape, the data recorder checks whether or not the data is recorded correctly. Then, the data recorder stores checked information in a memory. After the data recorder has finished its operation in response to the write command, the SCSI formatter accesses the checked information stored in the memory of the data recorder and determined on the basis of the checked information thus accessed whether or not the data is written correctly. As shown in FIG. 6B, if it is determined by the SCSI formatter that the data is not correctly recorded on the tape, then the SCSI formatter transfers again the same data to the data recorder and controls the data recorder such that the tape position is set to the last position of the data which could not be recorded correctly.

Figure 6C:
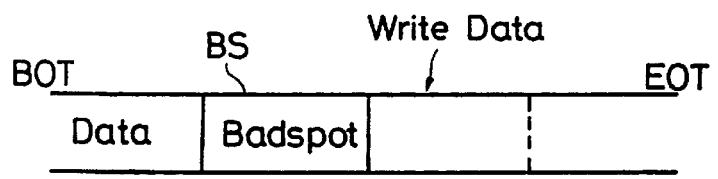
Figure 6D:
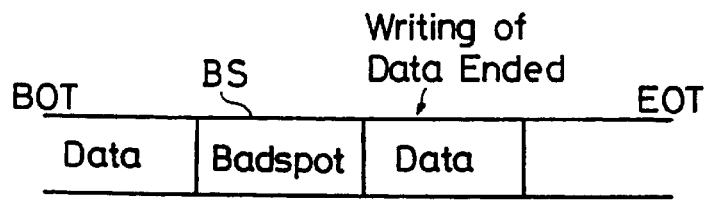

Therefore, after the tape position is set to the last position of the data which could not be recorded correctly, as shown in FIG. 6C, the data recorder starts recording the data supplied thereto from the SCSI formatter from the next position of the last position of the data which could be recorded correctly. As shown in FIG. 6D, after the recording is ended, data that should be recorded on the BS is recorded next to the BS. In other words, "BS" means the area on the tape in which data cannot be recorded correctly.

When the BS occurs, the SCSI formatter registers BS information or the like on a BST (bad spot table) provided within the DIT.

Figure 7:
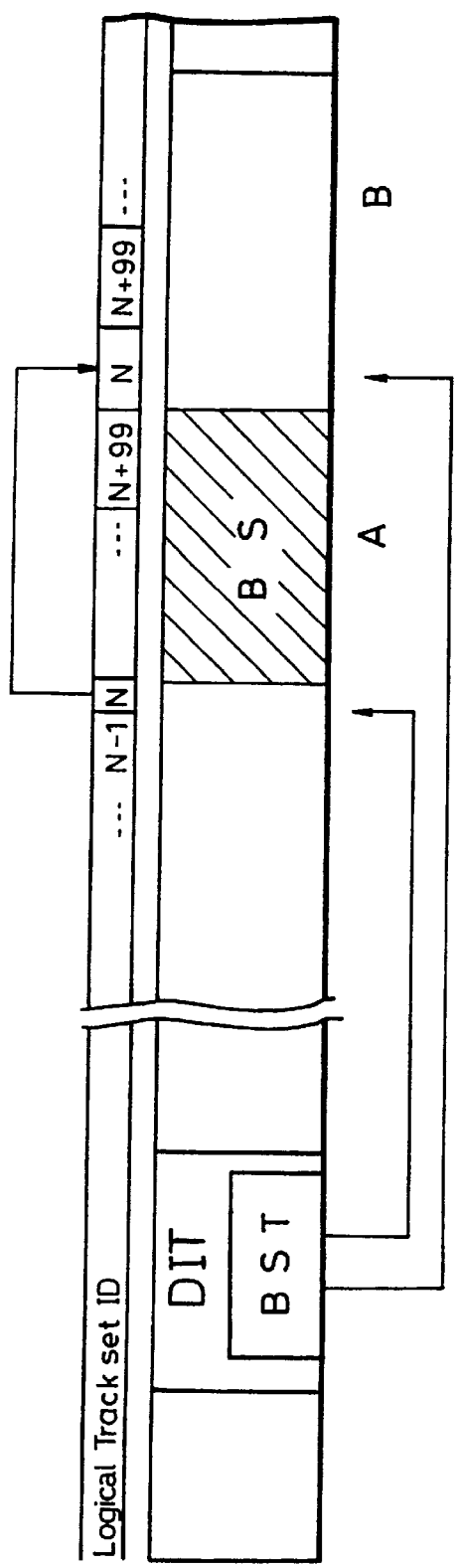
FIG. 7 is a schematic diagram used to explain an arrangement of a DIT in the DTF format according to the embodiment of the present invention.

How to store the resulting BS information will be described with reference to FIG. 7. FIG. 7 is a diagram used to explain the state that the BST is formed within the DIT when the BS occurs.

In FIG. 7, the logical ID is illustrated on the upper portion. As shown in FIG. 7, when data cannot be correctly recorded on an area A in the Data area, the SCSI formatter records the same data on the next area B of the area A. Thus, the SCSI formatter transfers the data recorded on the area A to the data recorder and controls the data recorder. Therefore, the same data recorded on the area A is recorded on the area B. Further, as shown in FIG. 7, the helical track formed on the area B includes the logical ID of the same value of the logical ID included in the helical track formed on the area A. Specifically, since the SCSI formatter transfers exactly the same data as that recorded on the area A to the data recorder, as shown in FIG. 7, if the first logical ID of the area A is "N" and the last logical ID is "N+99", then the first logical ID of the area B is "N" and the last logical ID is "N+1".

When the BS takes place, the SCSI formatter registers the first and last logical IDs and physical IDs of the BS on the BST provided within the DIT stored on the memory and then records the DIT on the DIT recording area of the tape. Thus, when the tape is reproduced, if the UT provided within the DIT is placed in its OFF state, the position of the BS can be detected by checking the BST provided within the DIT. Thus, it is possible to correctly reproduce the data in the area B.

Accordingly, if the UT provided within the DIT is placed in its ON state, then it is necessary to generate the DIT again. Otherwise, the position of the BS and the position of the TM cannot be recognized correctly and data cannot be reproduced correctly. This case will be described below.

If a trouble occurs in the file format because the SCSI formatter cannot record the DIT stored in the memory on the tape due to interruption of power, failure or the like, then when such troubled tape cassette is used one more time, the SCSI formatter detects from the fact that the UT is placed in its ON state that the DIT has to be generated. As a result, the SCSI formatter carries out the recovery operation to reconstruct the file format.

In order to carry out the recovery operation, it is necessary to know the final tape position at which valid data is written till the end of the write operation. Specifically, if the EOD position of the valid data is known, then it is possible to judge the extent that the file should be saved and reconstructed.

The actual recovery operation is carried out as follows. The BST is obtained by detecting the BS provided by the writing of a write error and a TMT (tape mark table) is obtained by detecting the TM. Then, the DIT is generated again on the basis of the BST and the TMT.

Figure 8:
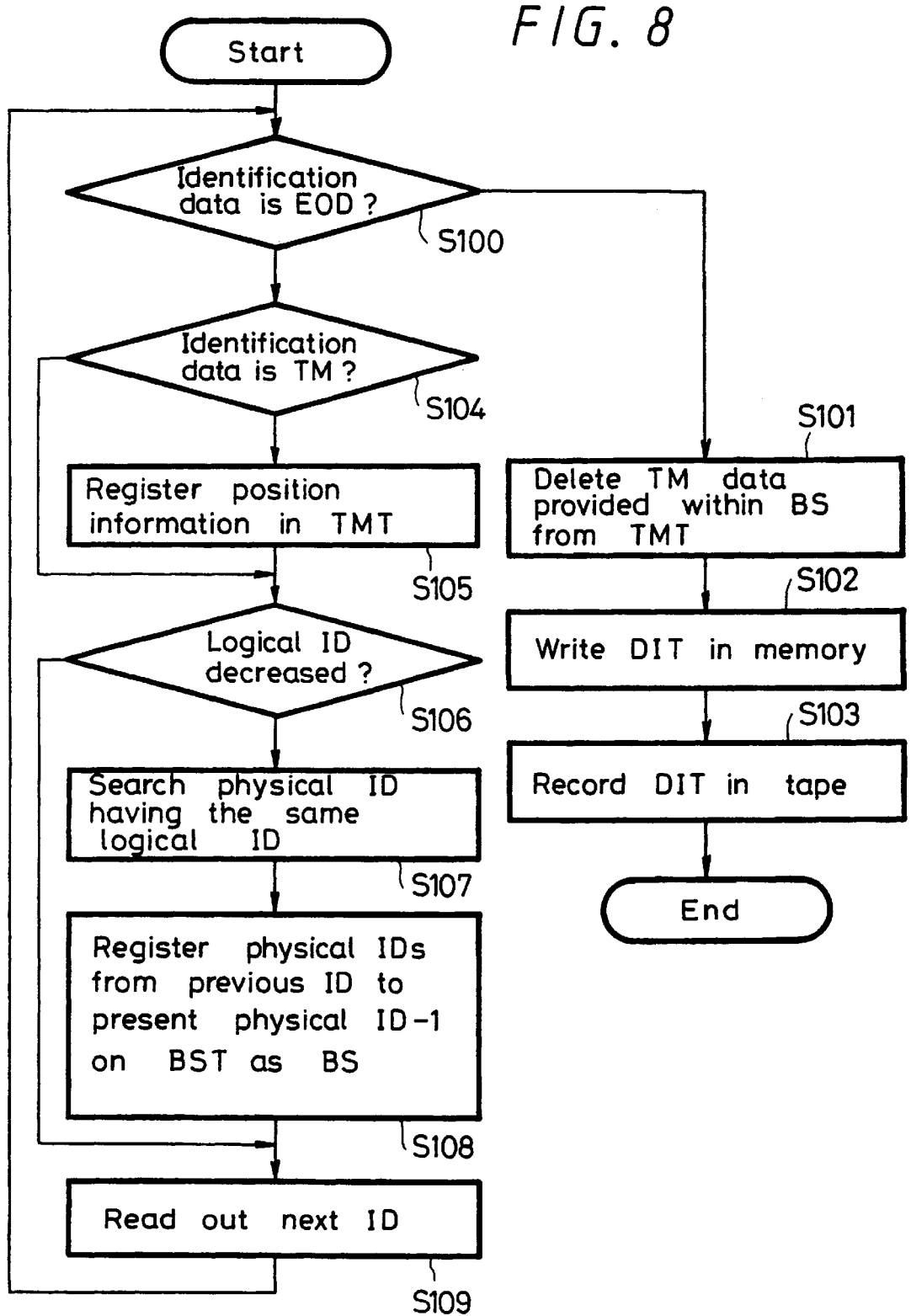
FIG. 8 is a flow chart to which reference will be made in explaining a recovery operation and to which reference will be made in explaining a technique which assumes the embodiment of the present invention.

An example of a method of carrying out the recovery operation will be described with reference to FIG. 8. FIG. 8 is a flowchart to which reference will be made in explaining the above recovery operation.

When the recovery operation is started, the SCSI formatter obtains the DIT by accessing the data recorder and stores the DIT thus obtained in the memory. Then, the SCSI formatter stores the physical IDs and logical IDs sequentially supplied thereto from the data recorder in the memory.

Referring to FIG. 8, following the start of operation, it is determined in decision step S100 by the SCSI formatter whether or not identification data representing attribute of data is EOD. If a YES is output at decision step S100, then the processing proceeds to step S101. If a NO is output at decision step S100, then the processing proceeds to step S104.

In step S101, TM data provided within the BST is deleted from the TMT. Specifically, after the position of the BS is detected, TM data provided within the BS of the TM is deleted from the TM data in the TMT stored on the memory. Then, the processing proceeds to step S102.

In step S102, the DIT is written in the memory. Specifically, the SCSI formatter constructs the DIT on the memory. Then, the processing proceeds to step S103.

In step S103, the DIT is written on the tape. Specifically, the SCSI formatter supplies the DIT stored in the memory to the data recorder and controls the data recorder. Thus, the data recorder records the DIT supplied thereto from the SCSI formatter on the tape. Then, the recovery operation is ended.

If it is determined in decision step S100 that the identification data is not the EOD, then the processing proceeds to the next decision step S104. It is determined in decision step S104 whether or not the identification data is TM. If a YES is output at decision step S104, then the processing proceeds to step S105. If a NO is output at decision step S104, then the processing proceeds to step S106.

In step S105, position information is registered in the TMT. Specifically, if it is determined in decision step S104 that the identification data is the TM, then the SCSI formatter registers position information representing the existence of the TM in the TMT stored in the memory at step S105. Then, the processing proceeds to the next decision step S106.

Figure 6E:
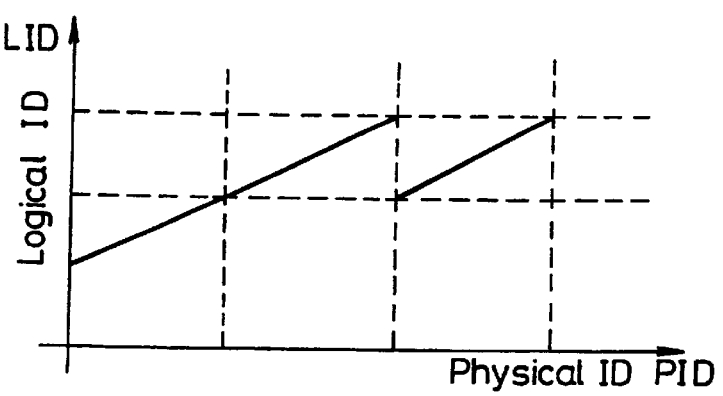

It is determined in decision step S106 whether or not the logical IDs are decreased. If a YES is output at decision step S106, then the processing proceeds to step S107. If a NO is output at decision step S106, then the processing proceeds to step S109. In step S106, it is determined whether or not logical IDs are decreased. As described above, since the logical ID supplied to the BS and the logical ID supplied to the next area of the BS are the same, as shown in FIG. 6E, the value of the first logical ID of the next area of the BS is decreased as compared with the value of the last logical ID of the BS. Accordingly, in order to judge the existence of BS, it is determined whether or not the logical IDs are decreased.

In step S107, the physical ID having the same logical ID is searched. Specifically, the SCSI formatter searches the physical ID having the same value as the first logical ID of the next area of the BS from the physical IDs stored in the memory. Then, the processing proceeds to step S108.

In step S108, physical IDs from the previous physical ID to the present physical ID−1 are registered on the BST as BS. Specifically, the SCSI formatter obtains a physical ID which is smaller than the present physical ID by "1" by subtracting "1" from the first physical ID of the next area of the BS. Then, the SCSI formatter recognizes physical IDs from the physical ID obtained at step S107 to the physical ID smaller than the present physical ID by "1" as BS and registers this information in the BST provided within the memory. Then, the processing proceeds to step S109.

In step S109, the next ID is read out and the processing returns to step S100.

According to this method, when the BST is formed upon recovery operation, the SCSI formatter checks the logical IDs over the whole user data area and determines a portion which is not increased monotonically as BS.

Accordingly, it is troublesome and takes a lot of time to check logical IDs when the recovery operation is carried out. Further, when the recovery operation is carried out by the SCSI formatter, the logical IDs of the user data area and physical IDs are all stored in the memory and examined whether or not they are matched with each other. Therefore, when the concept of BS is introduced, the storage capacity of the memory is increased with the result that the recovery operation becomes complex. Furthermore, it is difficult to realize the recovery operation.

Therefore, according to this embodiment, even when the concept of BS is introduced, the check processing in the recovery operation can be simplified and a time consumed in check processing can be reduced. Also, the storage capacity of the memory can be minimized and the processing for matching the logical ID and the physical ID can be simplified. The embodiment of the present invention will be described below.

The embodiment of the present invention will be described based on the matters that have been described so far in the "technique assuming the embodiment".

Figure 9:
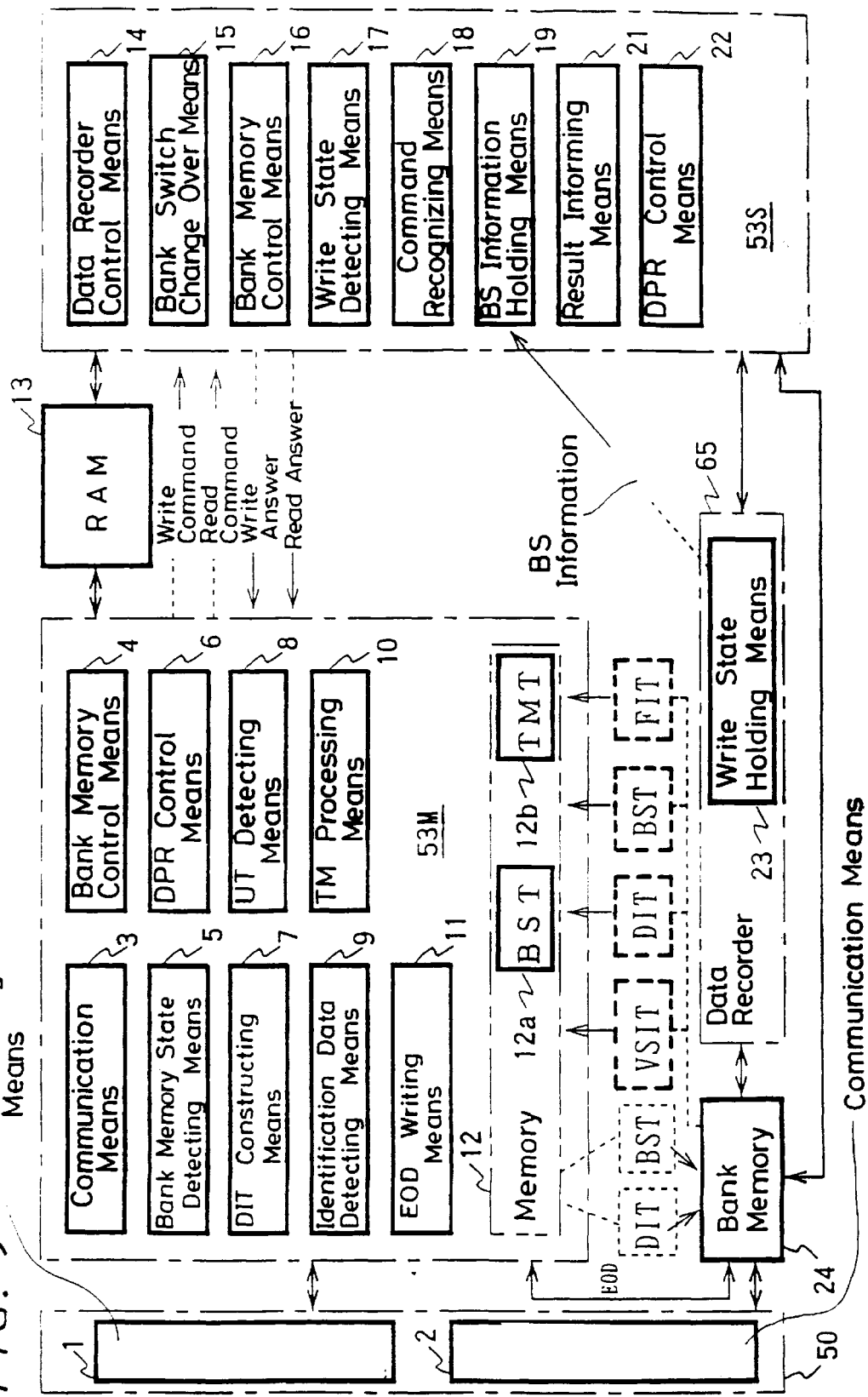
FIG. 9 is a schematic diagram used to explain a bad spot (BS) and to which reference will be made in explaining a technique which assumes the embodiment of the present invention.

FIG. 9 is a functional block diagram showing the embodiment of the present invention in which a magnetic recording apparatus, an information signal recording and reproducing system and a method of managing invalid area information are applied to a recording and reproducing system.

In FIG. 9, reference numeral 50 denotes a host computer, such as a personal computer, a work station or the like. Reference numeral 53M depicts a main control circuit and 53S depicts a sub control circuit. Reference numeral 13 depicts a RAM (random access memory), such as a dual-port RAM or the like. Reference numeral 24 depicts a bank memory formed of at least two memories of the same storage capacity. Reference numeral 65 depicts a data recorder. The host computer 50 and the main control circuit 53M are connected bidirectionally. The main control circuit 53M and the sub control circuit 53S are connected through the RAM 13. The sub control circuit 53S and the bank memory 24 are connected bidirectionally. The bank memory 24 and the data recorder 65 are connected bidirectionally and the bank memory 24 and the host computer 50 are connected bidirectionally.

A storage capacity of each of the two memories constructing the bank memory 24 is about 16 Mbytes.

The above-mentioned elements and parts will be described below respectively. The host computer 50 is composed of a file generating means 1 for filing various data, such as document data, graphics data, program data, image data, audio data or the like, and a communication means 2 for transmitting data filed by the file generating means 1 or receiving the file data.

The main control circuit 53M is composed of a communication means 3 for transmitting file data, which is reproduced by the data recorder 65 and stored in the bank memory 24, to the host computer 50 and receiving the file data transmitted thereto from the host computer 50, a bank memory control means 4 for controlling the bank memory 24 when a communication with the host computer 50 is carried out, a bank memory state detecting means 5 for detecting the storage capacity of the bank memory 24, a dual-port memory (DPM) control means 6 for writing various commands in the RAM 13 and reading various information supplied thereto from the RAM 13 through the sub control circuit 53S, a DIT constructing means 7 for constructing the DIT by generating DIT informations upon recovery operation, a UT detecting means 8 for detecting whether or not the UT in the DIT read out by the data recorder 65 and stored in the bank memory 24 when the tape cassette is loaded onto the data recorder in "ON" or "OFF" ("ON": data is being recording, "OFF": recording of data is ended), an identification data detecting means 9 for detecting identification data, such as EOD, TM or the like, a TM processing means 10 for carrying out a processing, such as registration, deletion or the like of TM to and from the TMT, an EOD write means 11 for writing EOD stored in a ROM (read-only memory) or the like in the bank memory 24 only when an unformatted tape cassette is used for the first time, and a memory means 12.

The main control circuit 53M, the RAM 13 and the sub control circuit 53S constitute the SCSI formatter. The memory means 12 stores VSIT, DIT, BST and FIT. BST12a and TMT12b shown in the memory means 12 are stored in the memory means 12 and contents thereof are sequentially updated in response to the recovery operation and the state of the recording operation. These BST12a and TMT12b are updated and therefore the DIT and BST thus varied are supplied to the bank memory 24.

VSIT, DIT, BST, FIT each encircled by a bold broken line block are read out from the tape of the tape cassette loaded onto the data recorder 65 and supplied to the memory means 12. DIT and BST each encircled by a fine broken line block are varied on the memory means 12 and supplied through the bank memory 24 to the data recorder 65, thereby recorded on the tape of the tape cassette loaded onto the data recorder 65. Broken lines attached to the data, commands (write command and read command) and answers (write answer and read answer) depict output portions and solid line arrows thereof depict supply destinations, respectively.

The main control circuit 53M recognizes the position of the DIT on the tape by checking the contents of VSIT reproduced by the data recorder 65 and stored in the bank memory 24 and controls the data recorder 65 based on this recognition, whereby the DIT recorded on the tape is read out by the data recorder 65. The DIT from the data recorder 65 is stored in the bank memory 24, thereby making it possible for the main control circuit 53M to check the DIT stored in the bank memory 24.

Specifically, the main control circuit 53M reads out VSIT when the tape of the tape cassette is loaded onto the data recorder 65 and recognizes the position of DIT on the tape based on the content of the VSIT thus read out. Then, the main control circuit 53M obtains the DIT by controlling the data recorder 65 based on this recognition. The main control circuit 53M recognizes the position of BS based on the BST which is one of the contents of the DIT and also recognizes the position of file data based on the FIT which is one of the contents of the DIT. The main control circuit 53M controls the sub control circuit 53S in a manner corresponding to a command from the host computer 50 on the basis of VSIT and DIT (including BST12a, TMT12b and FIT) stored in the memory means 12, thereby accessing the data recorder 65 through the sub control circuit 53S.

The sub control circuit 53S is composed of a data recorder control means 14 for controlling the data recorder 65 with respect to preroll or the like, a bank switch change-over means 15 for switching the memory area of the bank memory 24, a bank memory control means 16 for controlling the bank memory 24 when data is communicated between the data recorder 65 and the bank memory 24, a write state detecting means 17 for determining whether or not the data recorder 65 writes data correctly by accessing from the data recorder 65 information representing a write state indicating whether or not the data recorder 65 writes data correctly, a command recognizing means 18 for recognizing the content of a command written in the RAM 13 by the main control circuit 53M, a BS information holding means 19 for obtaining BS information from the data recorder 65 and holding the BS information when BS is generated after the write state detecting means 17 detects the write state, a result informing means 21 for informing a write result in the data recorder 65 through the RAM 13 to the main control circuit 53M, and a dual-port RAM control means 22 for controlling the RAM 13.

The data recorder 65 is composed of a recording system for recording data, a reproducing system for reproducing data, a tape transport unit, a control unit, not shown and a write state holding means 23 for holding the write state.

Recording operation of the data storage system shown in FIG. 9 will be described.

The file generating means 1 of the host computer 50 sequentially generates file data. The file data thus generated by the file generating means 1 is sequentially supplied by the communication means 2 to the bank memory 24. The main control circuit 53M constructing the SCSI formatter receives a write command from the host computer 50 via the communication means 2.

The bank memory control means 4 supplies a write control signal to the bank memory 24, whereby the file data supplied from the host computer 50 is sequentially stored in one and the other memory of the bank memory 24. At that time, the TM processing means 10 adds TM data to the last portion of the file data supplied thereto from the host computer 50.

The bank memory state detecting means 5 detects whether or not the bank memory 24 becomes full of recorded data. If the bank memory 24 becomes full of data, the DPM control means 6 supplies the write control signal to the RAM 13. Then, the main control circuit 53M supplies the write command to the RAM 13, whereby the write command is stored in the RAM 13. When the write command is stored in the RAM 13, the DPM control means 22 of the sub control circuit 53S supplies a read control signal to the RAM 13 to thereby read the write command from the RAM 13. The EOD write means 11 writes EOD in the EOD data area of the bank memory 24. At that very time, the EOD includes the BST12a stored in the memory means 12.

The write command read out from the RAM 13 is recognized by the command recognizing means 18. The bank switch change-over means 15 supplies a switching control signal to the bank memory 24 so that the bank memory 24 is connected to one or the other memory. The bank memory control means 16 supplies the read control signal to the bank memory 24 at one or the other memory thereof which can be accessed through the bank switch change-over means 15.

The data recorder control means 14 supplies the control signal to the data recorder 65 to enable the data recorder 65 to carry out the write operation. Thus, data read out from the bank memory 24 is sequentially supplied to the data recorder 65 and recorded on the tape by the data recorder 65 so as to form helical tracks.

The data recorder 65 readily reproduces data recorded by one rotary magnetic head so as to form one helical track by the other rotary magnetic head. The data recorder 65 checks on the basis of error-corrected result of the reproduced data whether or not the writing is carried out correctly, and holds the checked result in the write state holding means 23. Subsequently, the write state detecting means 17 in the sub control circuit 53S supplies a control signal to the data recorder 65, whereby checked result information held in the write state holding means 23 of the data recorder 65 is held in the BS information holding means 19 as BS information. The BS information (invalid area information) is composed of the first physical ID and logical ID and the last physical ID and logical ID of the area which becomes BS.

When the write state detecting means 17 detects the occurrence of BS (strictly, invalid area which will become BS), the data recorder control circuit 14 supplies the control signal to the data recorder 65 so that the data recorder 65 advances the tape position to the position ahead of the last portion of BS including the preroll period. Then, the bank memory control means 16 supplies the read control signal to the bank memory 24. Data read out at that time is the same data as the data recorded on the area which became BS. The data read out from the bank memory 24 is supplied to the data recorder 65 and thereby sequentially recorded from the next area of the BS on the tape of the tape cassette loaded onto the data recorder 65.

After a series of data is recorded, the result informing means 21 supplies information representing the occurrence of BS to the RAM 13 as a write answer. At that time, the DPR control circuit 22 supplies the write control signal to the RAM 13. Thus, the information indicating the occurrence of BS is stored in the RAM 13 as the write answer. The DPR control means 6 of the main control circuit 53M supplies the read control signal to the RAM 13 to obtain the BS information stored in the RAM 13. Then, the main control circuit 53M registers the BS information read out from the RAM 13 in the BST12a stored in the memory means 12.

If the bank memory state detecting means 5 in the main control circuit 53M detects that the storage capacity of the bank memory 24 is not full of data and that the next command from the host computer 50 is not supplied, then the bank memory control means 4 supplies the write control signal to the bank memory 24 and the BST12a stored in the memory means 12 is supplied to the RAM 13. Thus, the content of the BST12a is registered in the EOD stored in the bank memory 24. The bank memory control means 4 supplies the read control signal to the bank memory 24 to read the data stored in the bank memory 24 and the EOD in which the content of the BST12a is registered. As a result, on the tape of the tape cassette loaded onto the data recorder 65 are recorded the data (file data and TM) transmitted from the host computer 50 and the EOD in which the content of the BST12a is registered.

If the main control circuit 53M, the sub control circuit 53S and the data recorder 65 are operated normally, when the tape cassette is unloaded, the DIT (including the BST) stored in the memory means 12 is supplied through the bank memory 24 to the data recorder 65 and recorded on the tape by the data recorder 65. At that time, the UT provided within the DIT is already updated and therefore placed in its OFF state.

However, if the supply of power is stopped before the DIT is not updated, when the magnetic recording apparatus is energized again, the above-mentioned recovery operation has to be made because the recorded state on the tape and the recorded state of the tape registered on the DIT are different from each other. The recovery operation will be described below.

The recovery operation of the magnetic recording apparatus shown in FIG. 9 will be described next.

When the tape cassette is loaded onto the data recorder 65, the main control circuit 53M supplies the read command to the RAM 13. The DPR control means 6 supplies a write control signal to the RAM 13, whereby the read command from the main control circuit 53M is stored in the RAM 13. The DPR control circuit 22 in the sub control circuit 53S supplies the read control signal to the RAM 13, whereby the read command is read out from the RAM 13. When the command recognizing means 18 recognizes the read command, the data recorder control means 14 supplies a control signal to the data recorder 65, whereby the data recorder 65 advances the tape position of the tape cassette loaded thereon to the front of the VSIT shown in FIG. 2 and reproduces the VSIT recorded on the tape. Then, the data recorder 65 is paused.

The VSIT reproduced by the data recorder 65 is supplied to the bank memory 24. The bank memory 24 receives the write control signal from the bank memory control means 16 in the sub control circuit 53S, whereby the bank memory 24 stores the VSIT supplied thereto from the data recorder 65. When the read answer from the sub control circuit 53S is supplied to the RAM 13 and the write control signal from the DPR control means 22 is supplied to the RAM 13, the read answer is written in the RAM 13.

The DPR control circuit 6 in the main control circuit 53M supplies the read control circuit to the RAM 13 to read the read answer stored in the RAM 13. The main control circuit 53M recognizes on the basis of the read answer read out from the RAM 13 that the reading is ended. Then, the bank memory control circuit 4 supplies the read control signal to the bank memory 24, whereby the VSIT stored in the bank memory 24 is read out from the bank memory 24 as shown by the bold broken line in FIG. 9 and supplied to and stored in the memory means 12.

The main control circuit 53M recognizes the position of the DIT by reading the contents of the VSIT stored in the memory means 12. Then, the main control circuit 53M supplies the read command to the RAM 13. Concurrently therewith, the DPR control means 6 supplies the write control signal to the RAM 13, whereby the read command is stored in the RAM 13. The DPR control means 22 in the sub control circuit 53S supplies the read control signal to the RAM 13, whereby the read command is read out from the RAM 13. The read command read out from the RAM 13 is recognized by the command recognizing means 18. Then, the data recorder control means 14 supplies the control signal to the data recorder 65, whereby the data recorder 65 advances the tape position of the tape cassette loaded thereon to the front of the DIT and starts reproducing the tape.

The DIT reproduced by the data recorder 65 is supplied to the bank memory 24. The bank memory 24 receives the write control signal from the bank memory control means 16 in the sub control circuit 53S and therefore the DIT from the data recorder 65 is stored in the bank memory 24. When the read answer from the sub control circuit 53S is supplied to the RAM 13 and the write control signal from the DPR control means 22 is supplied to the RAM 13, the read answer is written in the RAM 13.

The DPR control circuit 6 in the main control circuit 53M supplies the read control signal to the RAM 13 to read the read answer stored in the RAM 13. The main control circuit 53M recognizes on the basis of the read answer read out from the RAM 13 that the reading is ended. Then, the bank memory control means 4 supplies the read control signal to the bank memory 24, whereby the DIT stored in the bank memory 24 is read out from the bank memory 24 as shown by the bold broken line in FIG. 9 and supplied to the memory means 12, thereby stored in the memory means 12. As shown by the bold broken lines in FIG. 9, VSIT, DIT, BST and FIT are stored in the memory means 12. p The UT detecting means 8 in the main control circuit 53M judges whether or not the UT in the DIT is placed in its ON state. In the following description, assuming that the recovery operation is carried out, let us describe on the basis of the assumption that the UT detecting means 8 detects that the UT is in its ON state. If the UT detecting means 8 detects that the UT is placed in its ON state, then the main control circuit 53M recognizes that the recovery operation should be carried out. Incidentally, the UT detecting means 8 judges whether or not the UT is placed in its ON state. If the UT detecting means 8 detects that the UT is placed in its ON state, the UT stored in the memory means 12 is turned OFF.

The main control circuit 53M supplies the read command to the RAM 13 and the DPR control means 6 supplies the write control signal to the RAM 13, whereby the read command is stored in the RAM 13. The DPR control circuit 22 in the sub control circuit 53S supplies the read control signal to the RAM 13 to read the read command stored in the RAM 13. The read command read out from the RAM 13 is recognized by the command recognizing means 18, whereby the data recorder 14 supplies the control signal to the data recorder 65 to set the data recorder 65 in the playback mode.

When the data recorder 65 is placed in the playback mode, the data recorder 65 sequentially supplies information recorded on the tape to the bank memory 24. The bank memory control means 16 in the sub control circuit 53S supplies the write control signal to the bank memory 24, whereby reproduced data supplied to the bank memory 24 from the data recorder 65 is sequentially written in the bank memory 24. The identification data detecting means 9 in the main control circuit 53M determines by sequentially reading out data stored in the bank memory 24 whether or not the identification data thus read out is the EOD.

If the identification data is the TM, then the TM processing means 10 registers the TM in the TMT12*b* stored in the memory means 12. To register the TM means that the TM position information (physical ID and logical ID) is stored in the TMT12*b* stored in the memory means 12. If the TM is sequentially stored in the TMT12*b*, then it is possible to recognize the file data recorded on the data area because the TM is the information representing a pause between the adjacent file data.

If the identification data is the EOD, then the EOD includes the BST and the main control circuit 53M obtains the BST included in the EOD. Thus, the BST is stored in the memory means 12. It is to be noted that the BST in the DIT obtained from the tape when the tape is loaded on the apparatus is not accurate information because the UT is in its ON state. However, the BST included in the EOD is generated in the last of the recording operation when the BS is generated upon recording as described above, and is recorded on the tape as one information of the EOD. Therefore, the BST included in the EOD is accurate information. Then, the TM processing means 10 deletes TM data provided within the BS from the TMT12*b* by checking the accurate BST included in the EOD.

By the above-mentioned processing, the accurate TMT12*b* and the accurate BST12*a* included in DIT and EOD including BST that is not updated are stored in the memory means 12. The DIT constructing means 7 in the main control circuit 53M supplies the DIT stored in the memory means 12 to the bank memory 24 as shown by the thin broken line in FIG. 9. At that time, the bank memory control means 4 supplies the write control signal to the bank memory 24, whereby the DIT is written in the bank memory 24. Subsequently, the DIT constructing means 7 supplies the BST12*a* included in the EOD stored in the memory means 12 to the bank memory 24 as shown by the thin broken line in FIG. 9. On the other hand, the bank memory control means 4 supplies the write control signal to the bank memory 24. At that time, this write control signal becomes an address representing the BST area of the DIT stored in the bank memory 24. Thus, the BST included in the EOD is overwritten on the BST area of the DIT which is not updated stored in the bank memory 24, thereby the correct DIT being constructed on the bank memory 24.

The main control circuit 53M supplies the write command to the RAM 13, while the DPR control means 6 supplies the write control signal to the RAM 13, whereby the write command is stored in the RAM 13. The DPR control means 22 in the sub control circuit 53S supplies the read control signal to the RAM 13, whereby the write command is read out from the RAM 13. The write command read out from the RAM 13 is recognized by the command recognizing means 18, and the data recorder control means 14 supplies the control signal to the data recorder 65, whereby the data recorder 65 advances the tape position of the loaded the tape cassette to the front of the position of the tape at its area in which the DIT is recorded.

In response to the control signal supplied thereto from the data recorder control means 14, the data recorder 65 is set in the reproducing mode during the preroll period and is placed in the recording mode when the data recorder 65 reaches the area in which the DIT is recorded. At that time, the bank memory control means 16 supplies the bank memory 24 with the read control signal, whereby the DIT stored in the bank memory 24 is read out. The DIT read out from the bank memory 24 is supplied to the data recorder 65 and overwritten by the data recorder 65 in the DIT area originally recorded on the tape. By the above-mentioned processing, the updated DIT is recorded on the tape, whereby this tape cassette is recovered and can be used in a usual manner hereinafter.

As described above, according to this embodiment, since the BST is registered on the EOD and recorded on the tape upon recording, even if the correct DIT is not recorded due to troubles, such as when the supply of power is stopped and the failure occurs in the recording mode, then the TMT can be corrected by checking the correct BST included in the EOD and the DIT reproduced from the tape is stored in the bank memory. Thereafter, a new DIT is made by overwriting the correct BST obtained from the EOD on the BST stored area of the DIT and the newly made DIT is overwritten on the tape at its area in which the DIT is recorded, thereby recovering the format on the tape.

Therefore, it is possible to remove the work which needs a very large storage capacity and plenty of processing time, such as when the logical ID and the physical ID on the tape are stored and the portion in which the logical ID is reduced is set to the BS upon recovery unlike the technique which was earlier described as the premise of this embodiment.

Consequently, there can be achieved the large effects such that the processing required to recover the format can be simplified in a short period of time without increasing the storage capacity of the memory.

Figure 10:
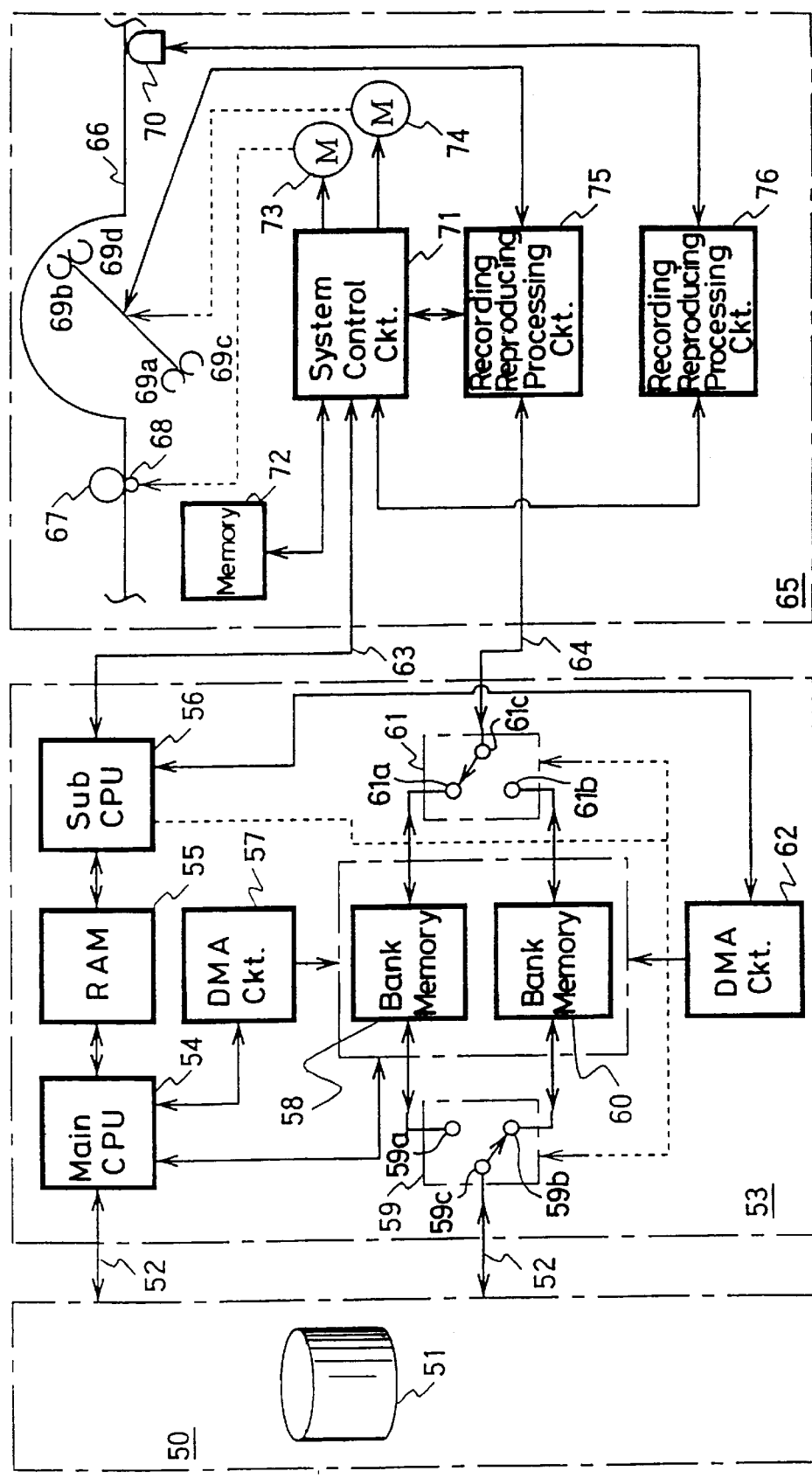
FIG. 10 is a block diagram showing the arrangement of the recording and reproducing system shown in FIG. 3 more fully.

A more specific example of the embodiment of the present invention will be described below with reference to FIG. 10. FIG. 10 is a block diagram showing a more specific example of the information recording and reproducing system shown in FIG. 9. In FIG. 10, like parts corresponding to those of FIG. 9 are marked with the same references and therefore need not be described in detail.

In FIG. 10, reference numeral 50 depicts the host computer, reference numeral 53 depicts the SCSI formatter and reference numeral 65 depicts the data recorder. The host computer 50 and the SCSI formatter 53 are connected via an SCSI-2 interface cable 52, and the SCSI formatter 53 and the data recorder 65 are connected via an RS422 cable 63 and a data input and output cable 64. The SCSI formatter 53 corresponds to the main control circuit 53M, the RAM 13, the bank memory 24 and the sub control circuit 53S shown in FIG. 9.

The host computer 50 includes, in addition to the hard disk drive 51 which can make the supply of mass-storage data possible, the computer body (not shown) including a CPU (central processing unit), a ROM (read only memory) and a RAM, a television monitor, a keyboard and an interface circuit for communication. The hard disk drive 51 records therein DOS (disk operating system) including the file generating means 1, the communication means 2 serving as the device driver shown in FIG. 9 and various kinds of software programs. When the host computer 50 is energized, the DOS resides in the main memory of the RAM of the host computer 50. Further, when various kinds of software programs are activated, the main program of the software resides in the main memory so that the file data, which is generated by the file generating means 1 of the DOS and is processed by such software can be transmitted to the SCSI formatter 53 through the communication interface circuit or the like driven by the communication means 3.

As shown in FIG. 10, the SCSI formatter 53 comprises a main CPU 54 for mainly communicating to computer 50 and exchanging commands between it and a sub CPU 56, a RAM 55 (dual-port RAM) for exchanging commands and answers between the main CPU 54 and the sub CPU 56, the sub CPU 56 for controlling the exchange of data to the main CPU 54 and the data recorder 65, a DMA (direct memory access) circuit 57 controlled by the main CPU 54, a DMA circuit 62 controlled by the sub CPU 56, bank memories 58 and 60 for storing data transferred thereto from the host computer 50 and storing data reproduced from the data recorder 65 and change-over switches 59 and 61 for switching the bank memories 58 and 59 on the basis of a switching control signal supplied thereto from the sub CPU 56.

Each storage capacity of the bank memories 58 and 59 is about 16 M bytes.

The host computer 50 and the main CPU 54 are connected via the SCSI-2 interface control signal transmission cable 52. The host computer 50 and a movable contact 59c of the switch 59 are connected via the SCSI-2 interface data transmission cable 52. One fixed contact 59a of the switch 59 is connected to one input and output terminal of the bank memory 58, and the other fixed contact 59b of the switch 59 is connected to one input and output terminal of the bank memory 60. One fixed contact 61a of the switch 61 is connected to the other input and output terminal of the bank memory 58, and the other fixed contact 61b of the switch 61 is connected to the other input and output terminal of the bank memory 60.

The switches 59 and 61 are changed in position in response to the switching control signal supplied thereto from the sub CPU 56 as follows, thereby selecting any one of the bank memories 58 and 60.

The main CPU 54 and the DMA circuit 57 correspond to the main control circuit 53M shown in FIG. 9; the sub CPU 56 and the DMA circuit 62 correspond to the sub control circuit 53S shown in FIG. 9; the RAM 55 corresponds to the RAM 13 shown in FIG. 9; and the bank memories 58, 60 and the switches 59, 61 correspond to the bank memory 24 shown in FIG. 9. Further, the DMA circuit 57 corresponds to the bank memory control means 4 shown in FIG. 9 and the DMA circuit 62 corresponds to the bank memory control means 16 shown in FIG. 9.

The main CPU 54 has the arrangement or function corresponding to the communication means 3, the bank memory state detecting means 5, the DPR control means 6, the DIT constructing means 7, the UT detecting means 8, the identification data detecting means 9, the TM processing means 10, the EOD writing means 11 and the memory means 12 shown in FIG. 9. The sub CPU 56 has the arrangement or function corresponding to the data recorder control means 14, the bank switch change-over means 15, the write state detecting means 17, the command recognizing means 18, the BS information holding means 19, the result informing means 21 and the DPR control means 6 shown in FIG. 9. Concerning the function, the above-mentioned function may be the software stored in the ROMs included in the main CPU 54 and the sub CPU 56. In this case, when the information signal recording and reproducing system is energized, the software program data stored in the ROM of the main CPU 54 resides in the main memory of the main CPU 54 so that the operation using the function shown in FIG. 9 can be realized. Further, the software program data stored in the ROM of the sub CPU 56 resides in the main memory of the sub CPU 56 so that the operation using the function shown in FIG. 9 can be realized.

The data recorder 65 is comprised of a capstan 68 and a pinch roller 67 for transporting a magnetic tape 66, rotary magnetic heads 69a, c, 69b, d, a CTL (control) head 70 for recording the physical ID on the magnetic tape 66 at its tracks in the longitudinal direction, a capstan motor 73, a drum motor 74, a cassette compartment formed of a reel motor, a loading mechanism or the like, though not shown, a system control circuit 71, a recording and reproducing processing circuit 75, a recording and reproducing processing circuit 76 and a memory 72. The system control circuit 71 and the sub CPU 56 of the SCSI formatter 53 are connected via an RS422 interface cable 63. The recording and reproducing processing circuit 75 and the movable contact 61c of the switch 61 in the SCSI formatter 53 are connected via a data input and output cable 64.

The above-mentioned system control circuit 71 controls the capstan motor 73, the recording and reproducing processing circuit 76, particularly, the recording of the physical ID on the basis of the control signal supplied thereto from the sub CPU 56. Upon recording, the system control circuit 71 checks the recording state on the basis of the flag data supplied thereto from the recording and reproducing processing circuit 75. The system control circuit 71 stores the checked result in the memory 72 and supplies the checked result stored in the memory 72 to the sub CPU 56.

Upon recording, the recording and reproducing processing circuit 75 effects various recording processings on the data supplied thereto from the SCSI formatter 53 and supplies the resulting data to the rotary magnetic head 69a or 69b. Upon reproducing, the recording and reproducing processing circuit 75 effects various reproducing processings on reproduced data supplied thereto from the rotary magnetic head 69a or 69b and supplies the resulting data to the SCSI formatter 53. Further, the recording and reproducing processing circuit 75 error-corrects reproduced data of recording data reproduced and supplied thereto immediately from the rotary magnetic head 69a or 69b upon recording. If there occurs data that cannot be error-corrected or there occurs data that cannot be error-corrected with a predetermined error rate or greater, then the error flag is supplied to the system control circuit 71.

Upon recording, the recording and reproducing processing circuit 76 supplies the physical ID data generated based on the control signal supplied thereto from the system control circuit 71 to the CTL head 70. Upon reproducing, the recording and reproducing processing circuit 76 supplies the physical ID data reproduced from the CTL head 70 to the system control circuit 71.

Operation of the recording and reproducing system shown in FIG. 10 will be described below with reference to flowcharts forming FIGS. 11 to 16.

Fundamental operation of the recording and reproducing system shown in FIG. 10, in particular, fundamental operation of the SCSI formatter 53 will be described with reference to a flowchart of FIG. 11.

Figure 11:
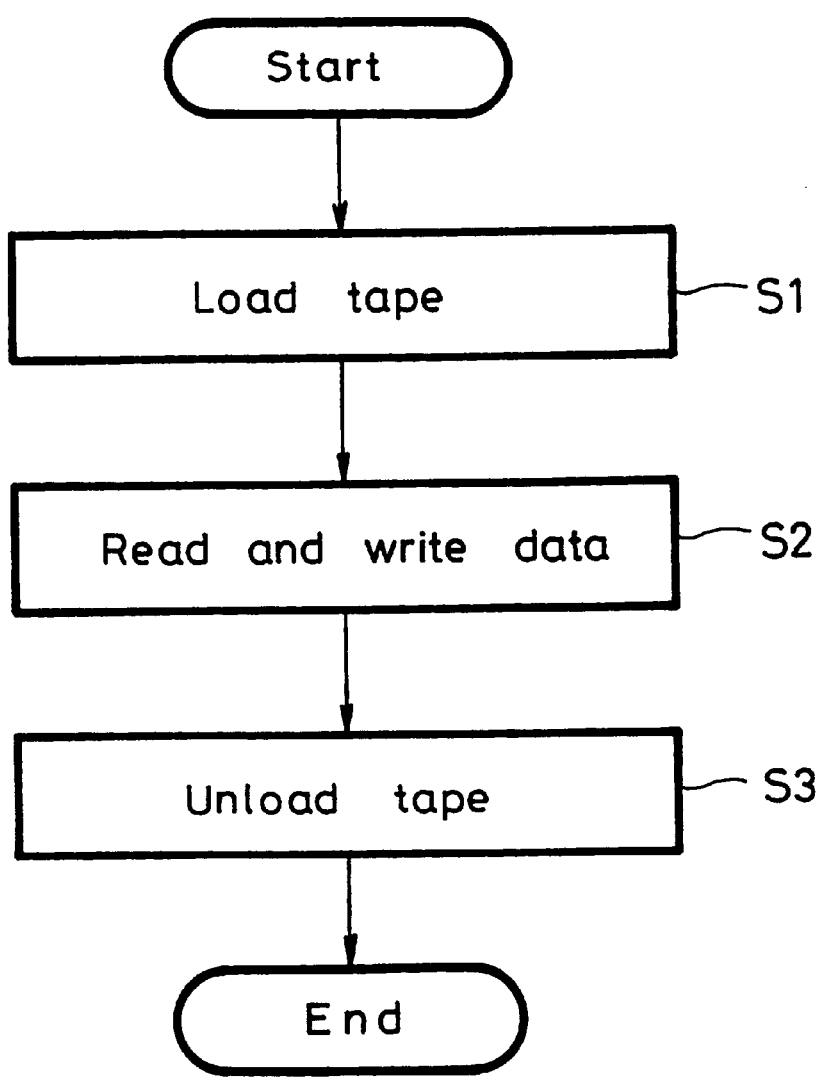
FIG. 11 is a flowchart to which reference will be made in explaining fundamental operation of an SCSI formatter in the recording and reproducing system shown in FIG. 1.

Referring to FIG. 11, following the start of operation, the processing proceeds to Step S1, whereat the tape is loaded onto the recording and reproducing system. Then, the processing proceeds to step S2. In this description, "load" means the operation which follows. That is, the sub CPU 56 controls the data recorder 65 in response to instruction supplied thereto from the main CPU 54 in such a manner that the VSIT is initially reproduced, the sub CPU 56 controls the data recorder 65 on the basis of the command that the main CPU 54 issues based on information of the reproduced VSIT to make the data recorder 65 reproduce the DIT and that the reproduced DIT is stored in the memory of the main CPU 54.

In step S2, data is read and written and then, the processing proceeds to step S3. Read operation will now be described. When the command from the host computer 50 is supplied to the main CPU 54, the main CPU 54 writes the read command in a RAM 55. The read command written in the RAM 55 is read out by the sub CPU 56 and then recognized by the sub CPU 56. When the sub CPU 56 recognizes the read command, the sub CPU 56 supplies the control signal to the system control circuit 71 of the data recorder 65. Thus, the system control circuit 71 supplies drive signals to the capstan motor 73 and the drum motor 74 to start the reproduction.

In the description which follows, in order to facilitate the understanding of the present invention, operation in which the main CPU 54 writes the command in the RAM 55 and the sub CPU 56 reads out and recognizes the command written in the RAM 55 will be simplified as "the main CPU 54 issues the command through the RAM 55 to the sub CPU 56".

Data reproduced from the magnetic tape 66 by the rotary magnetic heads 69a and 69b is supplied to the recording and reproducing processing circuit 75. The data supplied to the recording and reproducing processing circuit 75 is processed in various reproducing processing fashions, such as error-correction or the like, and then supplied to the switch 61.

On the other hand, the sub CPU 56 supplies switching control signals to the switches 61 and 59, whereby the movable contact 61c of the switch 61 is connected to one fixed contact 61a and the movable contact 59c of the switch 59 is connected to the other fixed contact 59b. Accordingly, the data from the recording and reproducing processing circuit 75 is supplied through the switch 61 to the bank memory 58. At that time, the write control signal is supplied from the DMA circuit 62 to the bank memory 58, whereby the data from the recording and reproducing processing circuit 75 is stored in the bank memory 58.

The sub CPU 56 supplies the switching control signals to the switches 61 and 59, whereby the movable contact 61c of the switch 61 is connected to the other fixed contact 61b and the movable contact 59c of the switch 59 is connected to one fixed contact 59a. Accordingly, the data from the recording and reproducing processing circuit 75 is supplied through the switch 61 to the bank memory 60. At that time, the write control signal is supplied from the DNA circuit 62 to the bank memory 60 and the read control signal is supplied from the DMA circuit 57 to the bank memory 59, whereby the data from the recording and reproducing processing circuit 75 is stored in the bank memory 60 and the stored data is read out from the bank memory 58. The data read out from the bank memory 58 is supplied through the switch 59 to the host computer 50. Similarly, the bank memories 58 and 60 are alternately switched to thereby write or read data.

When the read operation is ended by the above-mentioned processing, the sub CPU 56 writes the read answer in the RAM 55. The read answer written in the RAM 55 is read out by the main CPU 54, recognized by the main CPU 54 and supplied to the host computer 50 as result information based on the read answer. In the following description, in order to understand the present invention more clearly, operation in which the sub CPU 56 writes the answer in the RAM 55 and the main CPU 54 reads out and recognizes the answer written in the RAM 55" will be expressed as "the sub CPU 56 informs the answer through the RAM 55 to the main CPU 54".

The function of the CPU 56 for writing and reading data in and from the RAM 55 corresponds to the DPR control means 22 shown in FIG. 9; the function of the main CPU 54 for writing and reading data in and from the RAM 55 corresponds to the DPR control means 6 shown in FIG. 9; the switching function for switching the bank memories 58 and 60 corresponds to the bank switch change-over means 15 shown in FIG. 9; the DMA circuit 57 corresponds to the bank memory control means 4 shown in FIG. 9; the DMA circuit 62 corresponds to the bank memory control means 16 shown in FIG. 9; and the function of the sub CPU 56 for controlling the data recorder 65 corresponds to the data reorder control means 14 shown in FIG. 9. The above-mentioned correspondences are similar to those in the following description.

A write operation will be described below. When the command from the host computer 50 is supplied to the main CPU 54 and data of a predetermined data amount from the host computer 50 is stored in the bank memory 58 or 60, the main CPU 54 issues the write command to the sub CPU 56 through the RAM 55. The sub CPU 56 recognizes the write command and supplies the control signal to the system control circuit 71 of the data recorder 65, whereby the system control circuit 71 supplies the drive signals to the capstan motor 73 and the drum motor 74 to start the recording.

On the other hand, the sub CPU 56 supplies the switching control signals to the switches 59 and 61, whereby the movable contact 59c of the switch 59 is connected to one fixed contact 59a and the movable contact 61c of the switch 61 is connected to the other fixed contact 61b. Therefore the data transferred from the host computer 50 is supplied through the switch 59 to the bank memory 58. At that time, the DMA circuit 57 supplies the write control signal to the bank memory 58, whereby the data from the host computer 50 is stored in the bank memory 58.

Then, the sub CPU 56 supplies the switching control signals to the switches 59 and 61, whereby the movable contact 59c of the switch 59 is connected to the other fixed contact 59b and the movable contact 61c of the switch 61 is connected to one fixed contact 61a. Therefore, the data from the host computer 50 is supplied through the switch 59 to the bank memory 60. At that time, the DMA circuit 57 supplies the write control signal to the bank memory 60 and the DMA circuit 62 supplies the read control signal to the bank memory 58, whereby the data from the host computer 50 is stored in the bank memory 60 and the stored data is read out from the bank memory 58.

In the following description, in order to understand the present invention more clearly, operation in which the sub CPU 56 selects the bank memories 58 and 60 by supplying the switching control signals to the switches 59 and 61 will be simplified as "data is stored in the bank memory 58 or 60 and then read out therefrom".

The data read out from the bank memory 58 is supplied through the switch 61 to the recording and reproducing processing circuit 75. The data supplied to the recording and reproducing processing circuit 75 is processed in some suitable recording signal processing fashion, such as addition of error-correction code or the like and supplied to the rotary magnetic heads 69a and 69b. Then, the data is recorded by the rotary magnetic heads 69a and 69b on the magnetic tape 66 so as to form helical tracks. The physical ID data from the system control circuit 71 is supplied to the recording and reproducing processing circuit 76. The physical ID data processed by the recording and reproducing processing circuit 76 in a predetermined recording signal processing fashion is supplied to the CTL head 70 and recorded by the CTL head 70 on the longitudinal direction of the magnetic tape 66. Similarly, the bank memories 58 and 60 are alternately switched to thereby write or read data.

When the write operation is ended by the above-mentioned processing, the sub CPU 56 informs the write answer to the main CPU 54 through the RAM 55, whereby the main CPU 54 supplies result information based on the write answer to the host computer 50.

In step S3, the tape is unloaded, and the processing is ended. Operation "unloaded" means that the tape of the tape cassette loaded onto the data recorder 65 is returned to the inside of the tape cassette. Thereafter, the tape cassette is ejected. As a method of ejecting the tape cassette from the data recorder 65, there are known a method of ejecting the tape cassette by instructing the ejection with some suitable means, such as a keyboard of the host computer 50 or the like and a method of forcibly ejecting the tape cassette by depressing a switch (eject switch) of the data recorder 65. In the following description, a method of ejecting the tape cassette by means of the keyboard of the host computer or the like will be described.

When a command representing the ejection of the tape cassette is input to the host computer 50 via the keyboard of the host computer 50 or the like, the host computer 50 issues a command representing the ejection of the tape cassette to the main CPU 54 of the SCSI formatter 53. When the main CPU 54 of the SCSI formatter 53 recognizes the command representing the ejection supplied thereto from the host computer 50, the main CPU 54 writes the DIT stored in the memory thereof in the bank memory 58 or 60 and then issues the write command through the RAM 55 to the sub CPU 56.

The sub CPU 56 responds to the write command supplied thereto from the main CPU 54 to supply the control signal to the system control circuit 71 so that the data recorder 65 is placed in the recording mode. On the other hand, the sub CPU 56 supplies the control signal to the DMA circuit 62 to thereby read the DIT stored in the bank memory 58 or 60. The DIT read out from the bank memory 58 or 60 is supplied through the recording and reproducing processing circuit 75 to the rotary magnetic head 69a or 69b, thereby recorded on the magnetic tape 66 so as to form the helical tracks.

Subsequently, the main CPU 54 issues a command representing the ejection through the RAM 55 to the sub CPU 56. The sub CPU 56 supplies a control signal representing the ejection to the system control circuit 71 based on the command representing the ejection supplied thereto from the main CPU 54, whereby the system control circuit 71 supplies a drive signal to a motor which operates a loading mechanism (not shown) to unload the tape cassette. Thereafter, the tape cassette is ejected from the data recorder 65.

Figure 12:
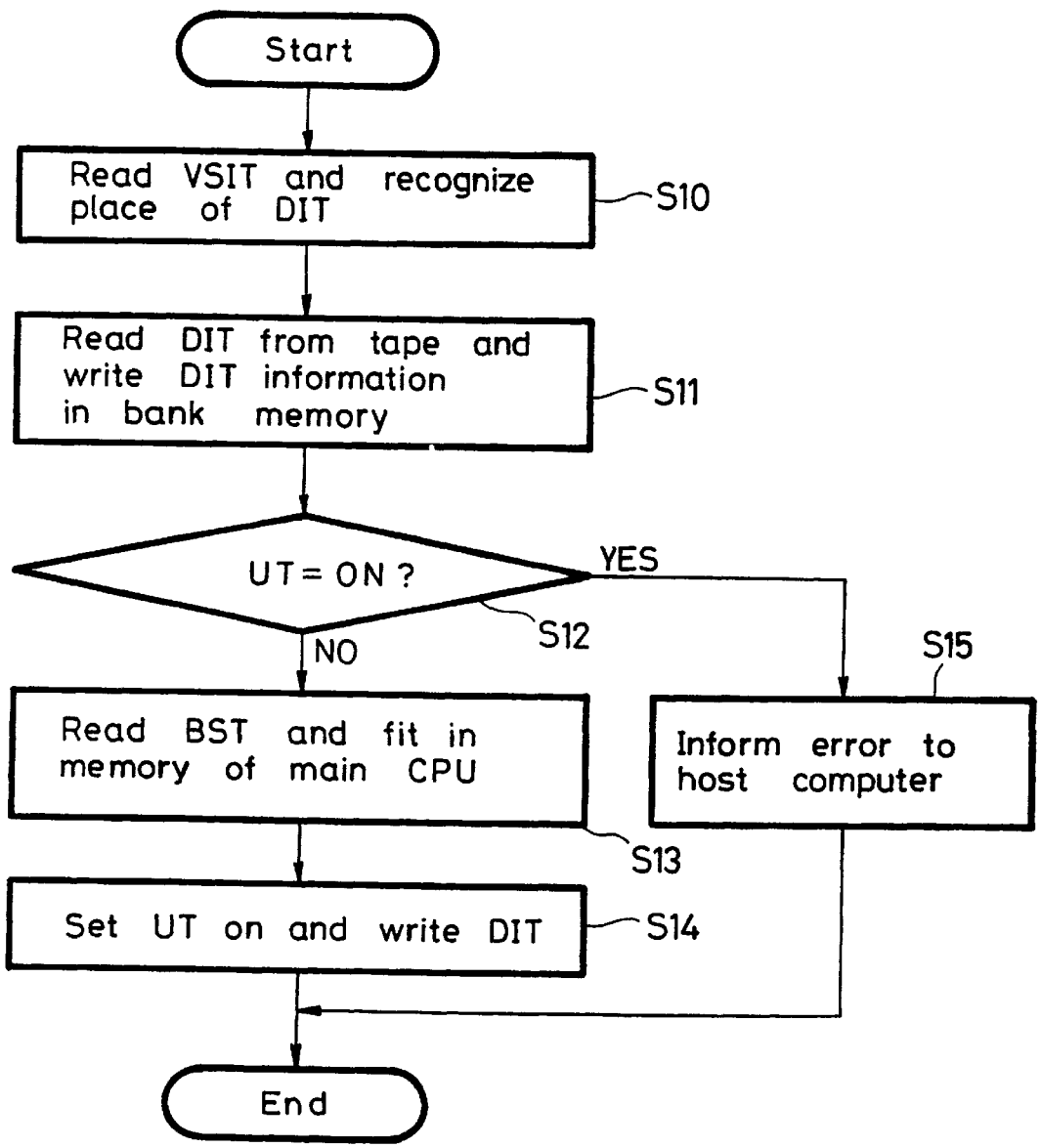
FIG. 12 is a flowchart to which reference will be made in explaining load operation of the recording and reproducing system shown in FIG. 1.

FIG. 12 is a flowchart to which reference will be made in explaining the loading operation in step S1 of the flowchart of FIG. 11 more fully.

Referring to FIG. 12, following the start of operation, the VSIT is read out and the place of the DIT is recognized at step S10. Then, the processing proceeds to step S11. In step S10, the main CPU 54 issues the read command through the RAM 55 to the sub CPU 56, whereby the sub CPU 56 supplies the control signal to the system control circuit 71 of the data recorder 65. The system control circuit 71 effects the reproduction by supplying the drive signal to the capstan motor 73 and the drum motor 74. The VSIT recorded on the magnetic tape 66 is reproduced by the rotary magnetic heads 69a and 69b and then supplied to the recording and reproducing processing circuit 75.

The VSIT processed by the recording and reproducing processing circuit 75 in a reproducing signal processing fashion, such as an error correction processing or the like, is supplied to the bank memory 58 or 60 and stored in the bank memory 58 or 60 in response to the write control signal from the DMA circuit 62. The sub CPU 56 informs the read answer to the main CPU 54 through the RAM 55.

Subsequently, under the control of the main CPU 54, the DMA circuit 57 outputs the read control signal. When the read control signal is supplied to the bank memory 58 or 60, the VSIT stored in the bank memory 58 or 60 is read out. The VSIT read out from the bank memory 58 or 60 is stored in the memory of the main CPU 54. The main CPU 54 reads out the position information (logical ID and physical ID) of the DIT by reading the content of the VSIT stored in the internal memory thereof.

In step S11, the DIT is read out from the tape, and information of the DIT is written in the bank memory 58 or 60. Then, the processing proceeds to the next decision step S12. In step S12, the main CPU 54 issues the read command to the sub CPU 56 through the RAM 55 based on the position information of the DIT recognized at step S11. The sub CPU 56 supplies the control signal to the system control circuit 71 based on the read command supplied thereto from the main CPU 54. The system control circuit 71 reproduces the DIT by carrying out a processing similar to that executed when the VSIT is reproduced. The reproduced DIT is processed by the recording and reproducing processing circuit 75 in a reproducing signal processing fashion, such as an error correction or the like, and supplied to the bank memory 58 or 60. At that time, the DMA circuit 62 outputs the write control signal under the control of the sub CPU 56, and this write control signal is supplied to the bank memory 58 or 60, whereby the DIT is stored in the bank memory 58 or 60. The sub CPU 56 informs the read answer to the main CPU 54 through the RAM 55.

The DMA circuit 57 outputs the read control signal under the control of the main CPU 54 and this read control signal is supplied to the bank memory 58 or 60, whereby the UT in the DIT stored in the bank memory 58 or 60 is read out. The UT read out from the bank memory 58 or 60 is stored in the memory of the main CPU 54.

It is determined in decision step S12 whether or not the UT is in its ON state. If a YES is output at decision step S12, then the processing proceeds to step S13. If a NO is output at decision step S12, then the processing proceeds to step S15. It is determined in decision step S12 whether or not the UT included in the DIT stored in the internal memory of the main CPU 54 is set to the ON state. The description function in step s12 corresponds to the UT detecting means 8 shown in FIG. 9.

In step S13, BST and FIT are read in the memory of the main CPU 54. Then, the processing proceeds to step S14. In step S13, the main CPU 54 controls the DMA circuit 57 so that the DMA circuit 57 outputs the read control signal to the bank memory 58 or 60, whereby the BST and the FIT in the DIT stored in the bank memory 58 or 60 are read out. The BST and the FIT read out from the bank memory 58 or 60 are stored in the memory of the main CPU 54.

In step S14, the UT is set to the ON state and the DIT is written. Then, the processing is ended. In step S14, the main CPU 54 supplies the bank memory 58 or 60 with a UT (e.g., "1") representing "ON" state, and controls the DMA circuit 57 so as to output the write control signal. Thus, the UT supplied from the main CPU 54 is overwritten in the DIT stored in the bank memory 58 or 60 at its area in which the UT is stored.

Subsequently, the main CPU 54 supplies the write command through the RAM 55 to the sub CPU 56. The sub CPU 56 controls the DMA circuit 62 so that the DMA circuit 62 outputs the read control signal, and supplies the control signal to the system control circuit 71 of the data recorder 65. Therefore, the DIT read out from the bank memory 58 or 60 is supplied through the recording and reproducing processing circuit 75 to the rotary magnetic heads 69a and 69b and recorded by the rotary magnetic heads 69a and 69b on the magnetic tape 66 so as to form the helical tracks.

If it is determined by the main CPU 54 in decision step S12 that the UT is placed in its ON state, then the processing proceeds to step S15, whereat an error is informed to the host computer 50. Then, the processing is ended.

Figure 13:
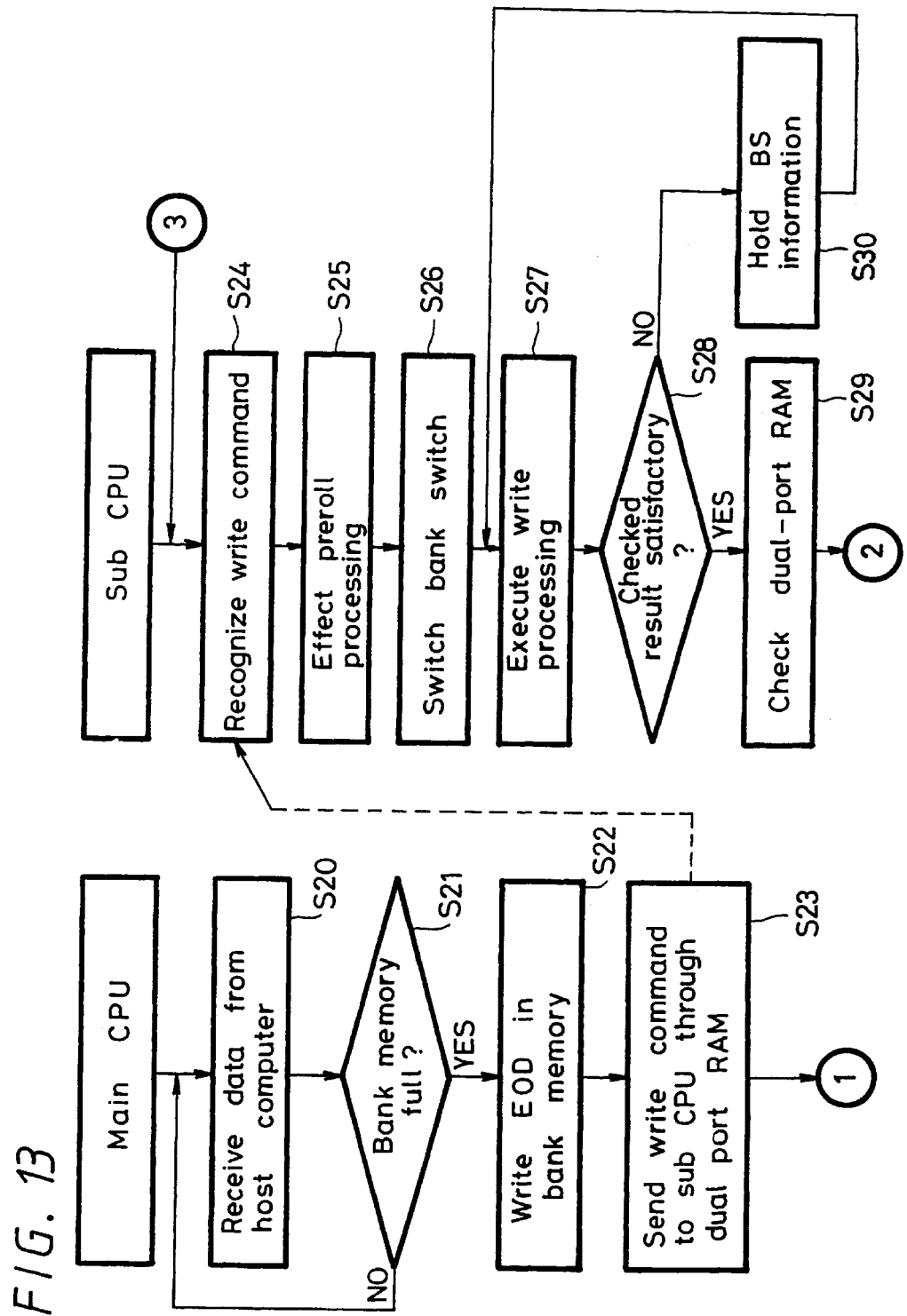
FIG. 13 is a flowchart to which reference will be made in explaining operation executed during write operation of a main CPU and a sub CPU on the recording and reproducing system shown in FIG. 1.
Figure 14:
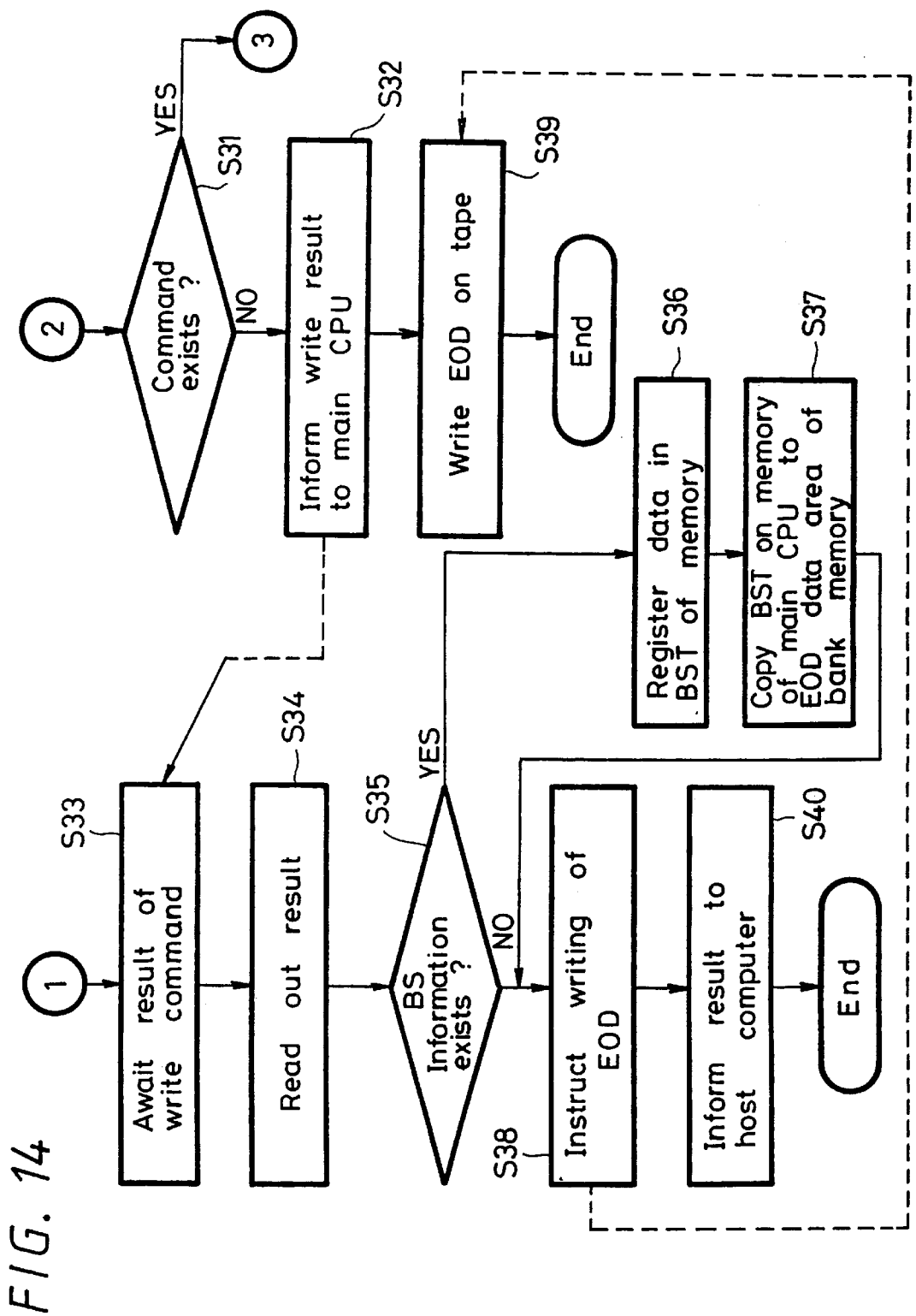
FIG. 14 is a flowchart to which reference will be made in explaining operation executed during write operation of the main CPU and the sub CPU in the recording and reproducing system shown in FIG. 1.

FIGS. 13 and 14 are flowcharts to which reference will be made in explaining operations of the main CPU 54 and the sub CPU 56 in the write operation in step S2 of the flowchart shown in FIG. 11. In FIGS. 13 and 14, the flowchart of the main CPU 54 and the flowchart of the sub CPU 56 are juxtaposed and transmission and reception of command or the like between the main CPU 54 and the sub CPU 56 is shown by a broken line arrow.

Referring to FIG. 13, in step S20, the main CPU 54 receives data from the host computer 50, and the processing proceeds to the next decision step S21. In step S20, write command data from the host computer 50 is supplied to the main CPU 54 and data to be recorded is supplied to the bank memory 58 or 60. A data reception function in step S20 corresponds to the communication means 3 shown in FIG. 9.

It is determined in decision step S21 whether or not the bank memory is full with data. If a YES is output at decision step S21, then the processing proceeds to step S22. Specifically, it is determined in decision step S21 by the main CPU 54 whether or not the bank memory 58 or 60 is full with data. Whether or not the bank memory 58 or 60 is full with data is determined by the main CPU 54 based on the address value of the address data of the write control signal output from the DMA circuit 57. If data starts being written from the area shown by the address "0" when the address of the area except the EOD area of the bank memory 58 or 60 lies in a range of from "0" to "9999", the fact that the bank memory 58 or 60 is "full" means that the address value of the address data of the write control signal output from the DMA circuit 57 becomes "9999". A function for detecting the state of the main CPU 54 at step S21 corresponds to the bank memory state detecting mean 5 shown in FIG. 9.

In step S22, the EOD is written in the bank memory, and the processing proceeds to step S23. In step S22, the main CPU 54 supplies the EOD held in its internal ROM or the like to the bank memory 58 or 60 and also controls the DMA circuit 57 so that the DMA circuit 57 outputs the write control signal including address data representing data area of EOD in the storage area of the bank memory 58 or 60. Thus, the EOD output from the main CPU 54 is stored in the EOD data area of the bank memory 58 or 60. A function for writing the EOD of the main CPU 54 in the bank memory 58 or 60 in step S22 corresponds to the EOD writing means 11 shown in FIG. 9.

In step S23, the write command is sent through the dual-port RAM to the sub CPU 56. Then, the processing proceeds to step S33 in the flowchart of FIG. 14. In step S23, the main CPU 54 supplies the write command through the RAM 55 to the sub CPU 56. Then, a shown by the broken line arrow in FIG. 13, the sub CPU 56 recognizes the write command in step S24. The processing proceeds to the next step S25. A command recognizing function of the sub CPU 56 in step S23 corresponds to the command recognizing mean 18 shown in FIG. 9.

In step S25, a preroll processing is carried out, and then the processing proceeds to step S26. In step S25, the sub CPU 56 supplies the control signal to the system control circuit 71, whereby the system control circuit 71 supplies the drive signal to the capstan motor 73 to advance the position of the magnetic tape 66 to the front of the recording position (corresponding to the starting time point of the preroll period). Thereafter, the system control circuit 71 supplies the drive signals to the capstan motor 73 and the drum motor 74 to start the reproduction. A function of the sub CPU 56 for controlling the data recorder 65 in step S25 corresponds to the data recorder control means 4 shown in FIG. 9.

In step S26, the bank switches 59 and 61 are changed over, and the processing proceeds to step S27. In step S26, the sub CPU 56 switches the switches 59 and 61 by supplying the switching control signals to the switches 59 and 61, thereby switching the bank memory 58 or 60 of the write side (side in which data is written by the main CPU 54) and the bank memory 58 or 60 of the read side (side in which data is read out by the sub CPU 56). The bank switch change-over function of the sub CPU 56 in step S26 corresponds to the bank switch change-over means 15 shown in FIG. 9.

In step S27, the write processing is executed, and the processing proceeds to step S28. In step S27, the sub CPU 56 supplies a control signal representing the start of recording to the system control circuit 71 and enables the DMA circuit 62 to output the read control signal. Therefore, the data stored in the bank memory 58 or 60 is read out by the read control signal from the DMA circuit 62 and then supplied to the recording and reproducing processing circuit 75. Then, the data is processed by the recording and reproducing processing circuit 75 in a predetermined recording processing fashion and supplied to the rotary magnetic heads 69a and 69b, thereby recorded by the rotary magnetic heads 69a and 69b on the magnetic tape 66 so as to form helical tracks. The physical ID data supplied to the CTL head 70 after it was generated by the system control circuit 71 and processed by the recording and reproducing processing circuit 75 in a predetermined recording fashion is recorded by the CTL head 70 on the longitudinal direction of the magnetic tape 66.

Immediately after the data is recorded by the rotary magnetic head 69a or 69b on the magnetic tape 66, the recorded data is reproduced by the rotary magnetic head 69a or 69b and the reproduced data is supplied to the recording and reproducing processing circuit 75, thereby processed by the recording and reproducing processing circuit 75 in a predetermined signal processing fashion, such as error correction or the like. The system control circuit 71 monitors the result of error correction in the recording and reproducing processing circuit 75. If there occurs data that cannot be error-corrected, then the system control circuit 71 stores the logical IDs and the physical IDs of the first and last portions of a series of recorded data in the memory 72.

In this embodiment, information composed of logical ID and physical ID of the starting portion and logical ID and physical ID of the last portion of a series of data to be stored in the memory 72 and which could not be recorded correctly is referred to as BS information (invalid area information: corresponding to the BS information shown in FIG. 9).

It is determined in decision step S28 whether or not the checked result is satisfactory. If a YES is output at decision step S28, then the processing proceeds to step S29. If a NO is output at decision step S28, then the processing proceeds to step S30. In decision step S28, the sub CPU 56 supplies the control signal to the system control circuit 71 and the BS information read out from the memory 72 of the data recorder 65 is obtained under the control of the system control circuit 71. If data is written normally, then it is not possible to obtain the BS information. A function of the sub CPU 56 for checking the writing result in step S28 corresponds to the write state detecting means 17 shown in FIG. 9.

In step S29, the dual-port RAM is checked, and the processing proceeds to step S31 of the flowchart forming FIG. 14. In step S29, the sub CPU 56 accesses the stored contents of the RAM 55 by supplying the control signal to the RAM 55.

In step S30, the BS information is held, and the processing again proceeds to step S27, whereat the write operation is carried out one more time by accessing the bank memory 58 or 60 in which data that could not be normally recorded is stored by the DMA circuit 62. In step S30, the BS information that was read out from the memory 72 when the system control circuit 71 accesses the memory 72 is held in the internal memory of the sub CPU 56. A function of the sub CPU 56 for holding BS information in step S30 corresponds to the BS information holding means 19 shown in FIG. 19.

It is determined in decision step S31 whether or not a command is stored in the RAM 55. If a YES is output at decision step S31, then the processing again proceeds to step S24, whereat the write command is recognized. If a NO is output at decision step S31, then the processing proceeds to step S32. In step S31, it is determined by the sub CPU 56 by judging the content of data obtained by accessing the stored content of the RAM 55 by supplying the control signal to the RAM 55 whether or not the command from the main CPU 54 is stored in the RAM 55.

In step S32, the write result is informed to the main CPU 54. Specifically, in step S32, as shown by a broken line arrow in FIG. 14, the sub CPU 56 informs the BS information stored in its internal memory to the main CPU 54 through the RAM 55. A function of the sub CPU 56 for informing the write answer in step S32 corresponds to the result informing means 21 shown in FIG. 9.

In step S33, the result of the write command is awaited, and then the processing proceeds to step S34. In step S34, the main CPU 54 accesses the RAM 55 until it receives the write answer from the sub CPU 56.

In step S34, the result is read out and the processing proceeds to the next decision step S35. In step S34, the main CPU 54 obtains the BS information from the RAM 55 as the write answer from the sub CPU 56.

It is determined in decision step S35 whether or not there exists the BS information. If a YES is output at decision step S35, then the processing proceeds to step S36. If on the other hand a NO is output at decision step S35, then the processing proceeds to step S38.

In step S36, the BS information is registered in the BST on the memory, and the processing proceeds to step S37. In step S36, the BS information read out from the RAM 55 in step S34 is registered in the BST which the main CPU 54 holds in its internal memory.

In step S37, the BST on the memory of the main CPU 54 is copied on the EOD data area of the bank memory and the processing proceeds to step S38. In step S37, let it be assumed that the BST, which was obtained by reproducing the magnetic tape 66 in the load operation shown in FIG. 11, is already stored in the memory of the main CPU 54. Then, the main CPU 54 supplies the BST held in its internal memory to the bank memory 58 or 60, and also controls the DMA circuit 57 so that address data of the control signal output from the DMA circuit 57 is set to a value representing the data area of EOD of the bank memory 58 or 60. Thus, the BST is registered on the EOD stored in the EOD data area of the bank memory 58 or 60.

In step S38, an EOD writing is instructed and then the processing proceeds to step S40. In step S38, the main CPU 54 issues a command instructing the EOD writing to the sub CPU 56 through the RAM 55, A broken line arrow extending from step S38 to step S39 shows the interhange of the above-mentioned command.

In step S39, the EOD is written on the tape and the processing is ended. In step S39, the DMA circuit 62 outputs the read control signal under the control of the sub CPU 56. An address represented by address data provided within the read control signal supplied from the DNA circuit 62 to the bank memory 58 or 60 is an address representing the EOD data area of the bank memory 58 or 60. Thus, the EOD stored in the bank memory 58 or 60 is read out from the EOD data area of the bank memory 58 or 60 in response to the read control signal from the DMA circuit 62. The EOD read out from the bank memory 58 or 60 is supplied to the recording and reproducing processing circuit 75 of the data recorder 65, processed by the recording and reproducing processing circuit 75 in a predetermined recording signal processing fashion, and then supplied to the rotary magnetic heads 69a and 69b, thereby recorded by the rotary magnetic heads 69a and 69b on the magnetic tape 66 so as to form the helical tracks.

In step S40, the write result is informed to the host computer 50, and the processing is ended. In step S40, the main CPU 54 supplies information representing the write result to the host computer 50 through the SCSI interface cable 52.

While a step for recording the EOD on the magnetic tape 66 is removed from the flowchart of FIG. 14 in order to understand the present invention more clearly, the main CPU 54 issues the write command to the sub CPU 56 through the RAM 55 after the step S37 was executed with the result that the sub CPU 56 writes the EOD on the magnetic tape 66 in step S38. When the EOD is written on the magnetic tape 66, similarly to steps S28 and S30 in the flowchart of FIG. 13, the write result is checked and the BS information obtained when the BS occurs on the basis of the checked result is held. Further, similarly the step S32, the sub CPU 56 informs the write result to the main CPU 54 and the BST is updated similarly to steps S33 to S37. Then, a series of operation is continued until the EOD can be recorded on the magnetic tape 66 correctly.

The BST in which the information of the BS occurred in the write operation is recorded on the magnetic tape 66 together with the DIT upon unloading operation which will be described below.

Figure 15:
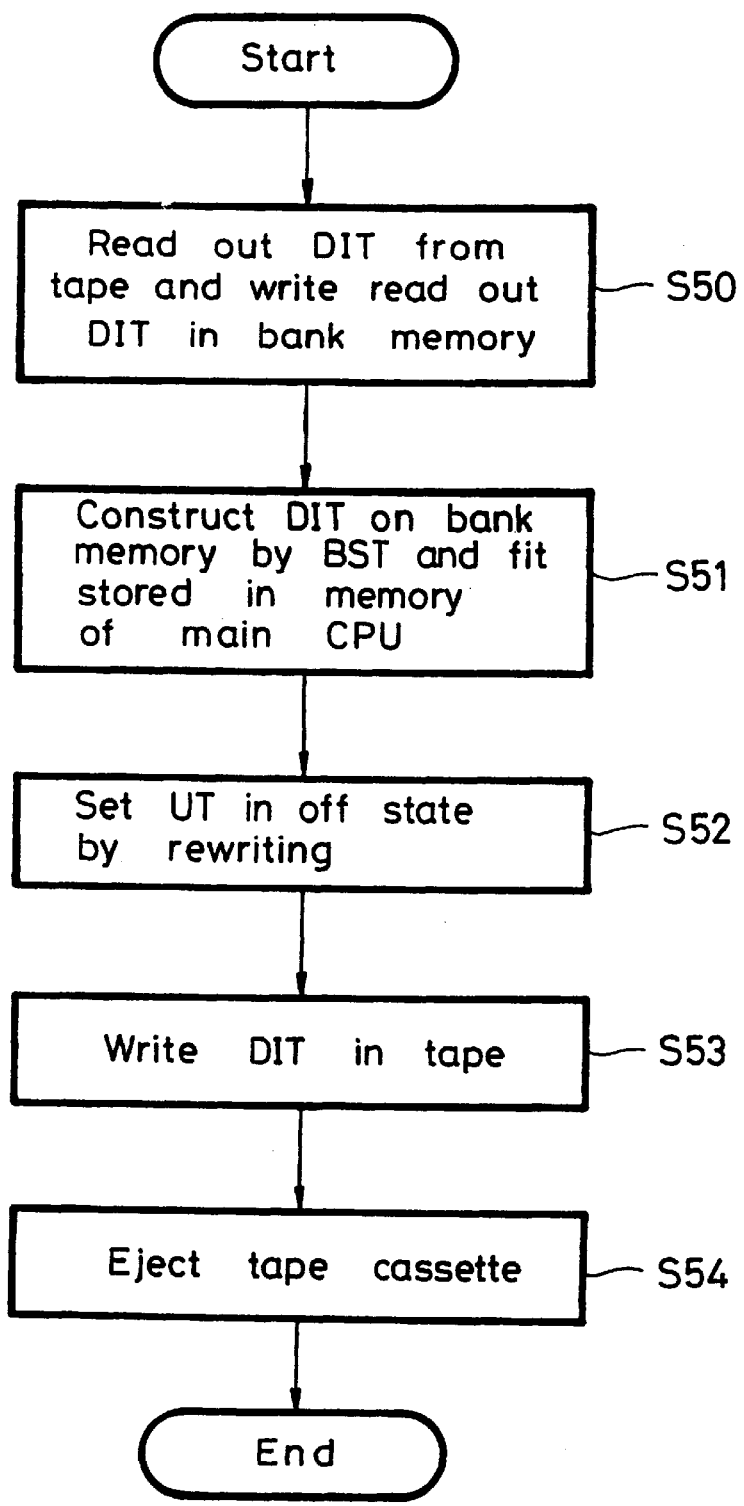
FIG. 15 is a flowchart to which reference will be made in explaining unload operation of the recording and reproducing system shown in FIG. 1.

Operation executed when the tape cassette is unloaded from the data recorder 65 will be described with reference to FIG. 15. FIG. 15 is a flowchart to which reference will be made in explaining the unloading operation.

Referring to FIG. 15, following the start of operation, in step S50, DIT is read out from the magnetic tape 66 and written in the bank memory. Then, the processing proceeds to step S51. In step S51, the main CPU 54 informs the read command to the sub CPU 56 through the RAM 55. Then, the sub CPU 56 supplies the control signal to the system control circuit 71 of the data recorder 65 such that the system control circuit 71 reads in the DIT. Accordingly, the system control circuit 71 advances the position of the magnetic tape 66 to a little front of the recording position of the DIT and supplies the drive signals to the capstan motor 73 and the drum motor 74, thereby reproducing the DIT recorded on the magnetic tape 66.

The reproduced data is processed by the recording and reproducing processing circuit 75 in a predetermined reproducing signal processing fashion and then supplied through the switch 61 to the bank memory 58 or 60. At that time, the sub CPU 56 supplies the write control signal to the DMA circuit 62 to enable the DMA circuit 62 to output the write control signal, whereby the DIT supplied to the bank memory 58 or 60 is stored in the bank memory 58 or 60. On the other hand, the sub CPU 56 informs the read answer to the main CPU 54 through the RAM 55. This operation is carried out because the UIT required to form the DIT is not stored in the memory of the main CPU 54.

In step S51, the DIT is formed on the bank memory from the BST and FIT stored in the memory of the main CPU 54. Then, the processing proceeds to step S52. In step S51, the main CPU 54 supplies the BST and the FIT stored in its internal memory to the bank memory 58 or 60 and also controls the DMA circuit 57 so that the DMA circuit 57 outputs the write control signal including address data representing the positions at which the BST and the FIT included in the DIT are stored in the bank memory. Thus, the BST and the FIT supplied from the main CPU 54 to the bank memory 58 or 60 are written in the bank memory 58 or 60 at its positions at which the BST and the FIT included in the DIT are stored, thereby constructing the correct DIT on the bank memory 58 or 60.

In step S52, the UT is switched to the OFF state by rewriting, and the processing proceeds to step S53. In step S52, the main CPU 54 supplies the UT representing the OFF state to the bank memory 58 or 60 and controls the DMA circuit 57 so that the DMA circuit 57 outputs the write control signal including the address data representing the position at which the UT in the DIT is stored in the bank memory 58 or 60. Thus, the UT representing the OFF state supplied from the main CPU 54 to the bank memory 58 or 60 is written in the bank memory 58 or 60 at its position in which the UT in the DIT is stored, whereby the UT of the DIT on the bank memory 58 or 60 is rewritten to the OFF state.

In step S53, the DIT is written on the tape, and the processing proceeds to step S54. In step S53, the main CPU 54 issues the write command to the sub CPU 56 through the RAM 55. When the sub CPU 56 recognizes the write command supplied thereto from the main CPU 54, the sub CPU 56 controls the DMA circuit 62 so that the DMA circuit 62 outputs the read control signal, and supplies the control signal to the system control circuit 71. The system control circuit 71 supplies the drive signal to the capstan motor 73 to advance the position of the magnetic tape 66 to the front of the recording position of the DIT, and then enables the data recorder 65 to carry out the preroll operation.

The DIT stored in the bank memory 58 or 60 is read out by the read control signal from the DMA circuit 62. The DIT read out from the bank memory 58 or 60 is supplied through the switch 61 to the recording and reproducing processing circuit 75, processed by the recording and reproducing processing circuit 75 in a predetermined recording signal processing fashion, and supplied to the rotary magnetic heads 69a and 69b, thereby recorded by the rotary magnetic heads 69a and 69b on the magnetic tape 66 so as to form helical tracks.

In step S54, the tape cassette is ejected and the processing is ended. In step S54, the sub CPU 56 supplies a tape cassette eject control signal to the system control circuit 71. Then, the system control circuit 71 supplies the drive signal to the motor of the loading mechanism (not shown) to perform the unloading processing. Thereafter, the system control circuit 71 supplies the drive signal to the motor of the tape cassette eject mechanism to eject the tape cassette.

Figure 16:
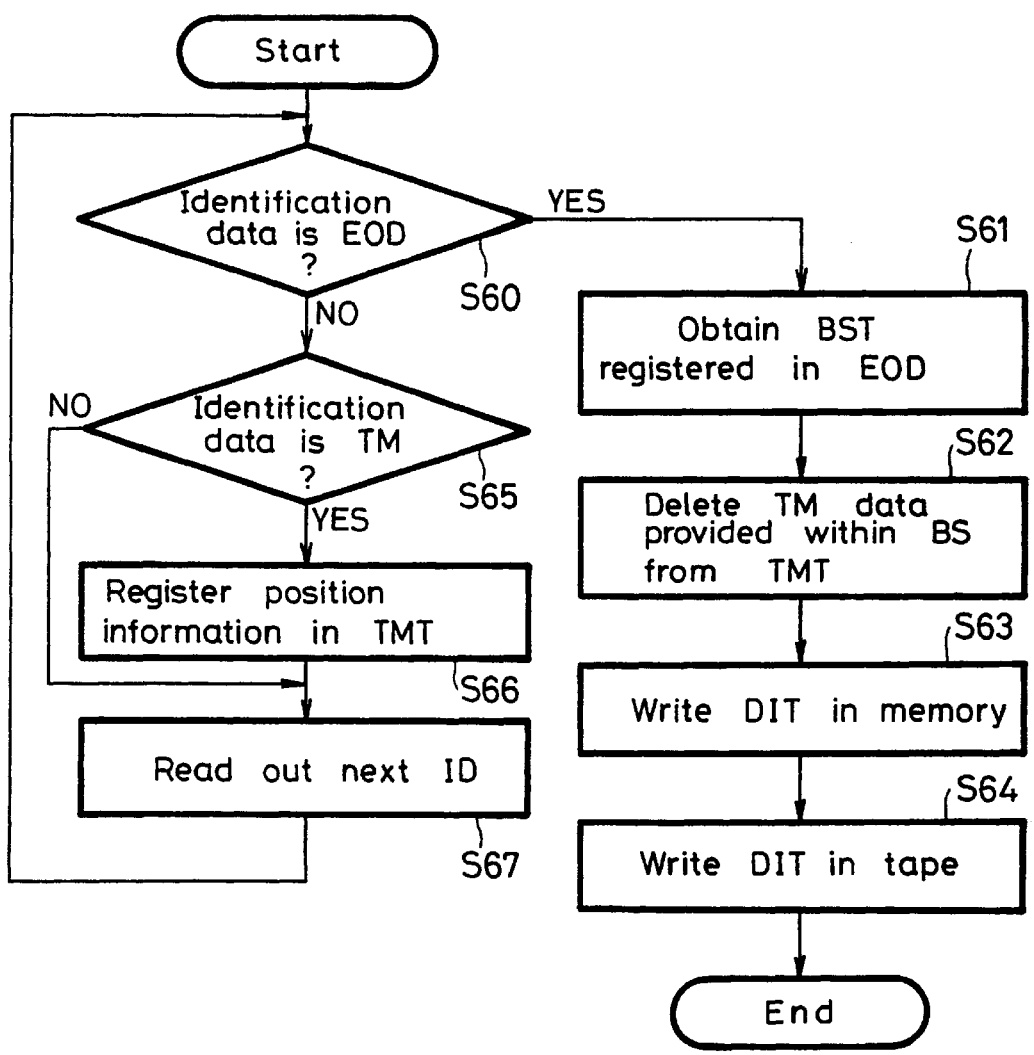
FIG. 16 is a flowchart to which reference will be made in explaining recovery operation of the recording and reproducing system shown in FIG. 1.

The recovery operation will be described below with reference to FIG. 16. FIG. 16 is a flowchart to which reference will be made in explaining the recovery operation. The recovery operation is composed of the operation for reading data on the tape executed based on the recovery operation instructing command supplied from the host computer 50 after the error was informed to the host computer 50 in step S15 in the flowchart of FIG. 12 executed upon loading and the processing for generating again the DIT by the above-mentioned reading operation. In the recovery operation, the reproduced data reproduced from the magnetic tape 66 is processed by the recording and reproducing processing circuit 75 and sequentially supplied to and stored in the bank memory 58 or 60 through the switch 61. The contents of the reproduced data are recognized by the main CPU 54.

Referring to FIG. 16, following the start of operation, it is determined in decision step S60 whether or not the identification data is the EOD. If a YES is output at decision step S60, then the processing proceeds to step S61. If on the other hand a NO is output at decision step S60, the the processing proceeds to step S65. Specifically, it is determined by the main CPU 54 at decision step S60 whether or not the identification data, which is obtained when the reproduced data stored in the bank memory 58 or 60 is sequentially read out, is the EOD. An identification data judging function in step S60 corresponds to the identification data detecting means 9 shown in FIG. 9.

In step S61, the BST is obtained and the processing proceeds to step S62. In step S61, the BST included in the EOD stored in the bank memory 58 or 60 is stored in the internal memory of the main CPU 54. The internal memory of the main CPU 54 corresponds to the memory means 12 shown in FIG. 9.

In step S62, TM data provided within the BS is deleted from TMT, and the processing proceeds to step S63. In step S62, only the TM data provided within the BS is deleted from the TM data within the TMT included in the DIT stored in the internal memory of the main CPU 54 by checking the BST stored in the internal memory of the main CPU 54. A function for deleting the TM data from the TMT in step S62 corresponds to the TM processing means 10 shown in FIG. 9.

In step S63, the DIT is written in the memory, and the processing proceeds to step S64. In step S63, the main CPU 54 supplies the DIT stored in its internal memory to the bank memory 58 or 60 and supplies the control signal to the DMA circuit 57 such that the DMA circuit 57 outputs the write control signal, thereby the DIT being written in the bank memory 58 or 60. Subsequently, the main CPU 54 supplies the BST stored in the internal memory thereof to the bank memory 58 or 60 and also supplies the control signal to the DMA circuit 57 such that the DMA circuit 57 outputs the write control signal including the address data representing the stored position of the BST in the DIT in the bank memory 58 or 60. Thus, correct BST obtained from the EOD is written in the stored area of the BST included in the DIT stored in the bank memory 58 or 60. A DIT constructing function at step S63 corresponds to the DIT constructing means 7 shown in FIG. 9.

If it is determined in decision step S60 that the identification data is not the EOD, then the processing proceeds to the next decision step S65. It is determined in decision step S65 whether or not the identification data is the TM. If a YES is output at decision step S65, then the processing proceeds to step S66. If on the other hand a NO is output at decision step S65, then the processing proceeds to step S67. It is determined in decision step S65 by the main CPU 54 whether or not the identification data, which is obtained when the reproduced data stored in the bank memory 58 or 60 is sequentially read out, in the TM.

In step S66, TM position information is registered in the TMT and the processing proceeds to step S67. In step S66, position information (logical ID and physical ID) of the TM recognized at step S65 is registered in the TMT included in the DIT stored in the internal memory of the main CPU 54. A function for registering the TM data in the TMT at step S66 corresponds to the TM processing means 10 shown in FIG. 9.

In step S67, data of the next ID is recognized and the processing returns to step S60, i.e., steps S60 to S67 are repeated until the EOD is recognized. By repeating the steps S65 to S67, all TM informations are registered in the TMT included in the DIT stored in the internal memory of the main CPU 54 finally. If the EOD is recognized, then it is possible to obtain the BST included in the EOD. Then, only the TM information included in the BS is deleted from the TM information included in the TMT by checking the BST and the DIT is written in the bank memory 58 or 60. Subsequently, the BST is written in the DIT at its area in which the BST is stored and the DIT, which is reconstructed within the bank memory 58 or 60, is recorded on the magnetic tape 66, thereby formatting the magnetic tape 66 one more time.

The DTF used the SCSI formatter 53 and the data recorder 65 will be described with reference to FIGS. 17 to 40. Specifications which are not described in the DTF should accord to the ANSI X3. 175-1990.

A write retry sequence will be described initially.

The write retry is carried out in the recording region in order to make data more reliable. In the area composed of a track set in which error occurs upon writing and the succeeding track set, the same track set including the subcode is not overwritten on the track in which error occurred but written one more time. The write retry is carried out at the pause of 128 kbytes (track set ID).

FIGS. 17A and 17B are schematic diagrams used to explain the updated state of the file in the logical volume.

In the EOD search upon overwriting as shown in FIG. 17A, when the magnetic tape is initialized, OWC representing the overwrite counter is initialized to "0". An IN representing an initialize number is initialized to "1258" by a resulting random number. Let it be assumed that files transmitted from the host computer are recorded on the magnetic tape in the order of F1 to F10.

The files F1 to F4 are added with the next files so that the overwrite counter OWC is not updated and added in the form of "0". Assuming that, when the file F4 is written, the write starting point is moved to the end of the file F1. Then, when the file starts being written from this point, if the data is added to somewhere of the user data, the file is incremented and the overwrite counter OWC has a value "1" written in its subcode.

Since the files F5 and F6 are the ends of the user data, the overwrite counter OWC holds "1". F7 is started from the end of the file F1 of somewhere of the user data and hence the overwrite counter OWC becomes "2". If the overwrite counter is updated according to a similar rule, the overwrite counter OWC becomes "4" in the file F10.

An EOD detection using such overwrite counter OWC will be described below. Since a track which serves as a mark indicating the EOD is recorded on the end portion of the user data, it is sufficient to search the EOD by sequentially reading out this track. If the recording by the data recorder is stopped due to accident before the track which serves as the EOD mark is written on the end portion of the user data, then it is necessary to detect EOD by other method than the method of detecting the EOD track.

The above-mentioned operation will be described with reference to FIGS. 17A and 17B. At that time, let it be assumed that an accident occurs during the FIO file is being written. In this case, let it be assumed that no track indicating EOD exists at the EOD position shown the a solid arrow in FIG. 17A.

When EOD is detected, an ID written in the subcode to indicate the EOD track is read out and also the value of the overwrite counter is checked. Since a method of updating the overwrite counter OWC is limited to the fact that the overwrite counter OWC is monotonically incremented toward the end of the magnetic tape, an overwritten old file F6 in which the overwrite counter OWC is "1" appears at the solid arrow EOD position of somewhere of F10 with the overwrite counter OWC "4". As described above, it is possible to detect that a portion where a mismatch occurs in the montonical increment of overwrite count value is EOD where recording is stopped due to accident.

FIG. 17B shows EOD search operation executed when the magnetic tape is initialized. If the magnetic tape used in FIG. 17A is initialized and an accident occurs at an EOD position shown by a solid arrow during file F101 is being written, then when the file F101 is overwritten, the overwrite counter OWC of F101 is "0" and the overwritten overwrite counter OWC which is not yet initialized is "4" and the overwrite counter OWC is incremented monotonically at the EOD position shown the solid arrow in FIG. 17B. Therefore, it is not possible to detect the EOD. In this case, EOD of the previous file F10 is detected erroneously.

For this reason, the initialize manner number IN is served in joint use. Let it be assumed that a random number is generated by the initialization executed before F101 is written and that an initialize number IN of F101 is set to "395024". In that case, since an initialize number of F10 is "1258" and an initialize number IN of the F101 is "395024", the initialize number IN is updated only by the initialization. Therefore, it is to be understood that the F10 is the previously initialized file. Then, it is possible to detect that the solid arrow EOD position in which the initialize number IN is changed in the point where the accident occurred.

Figure 18:
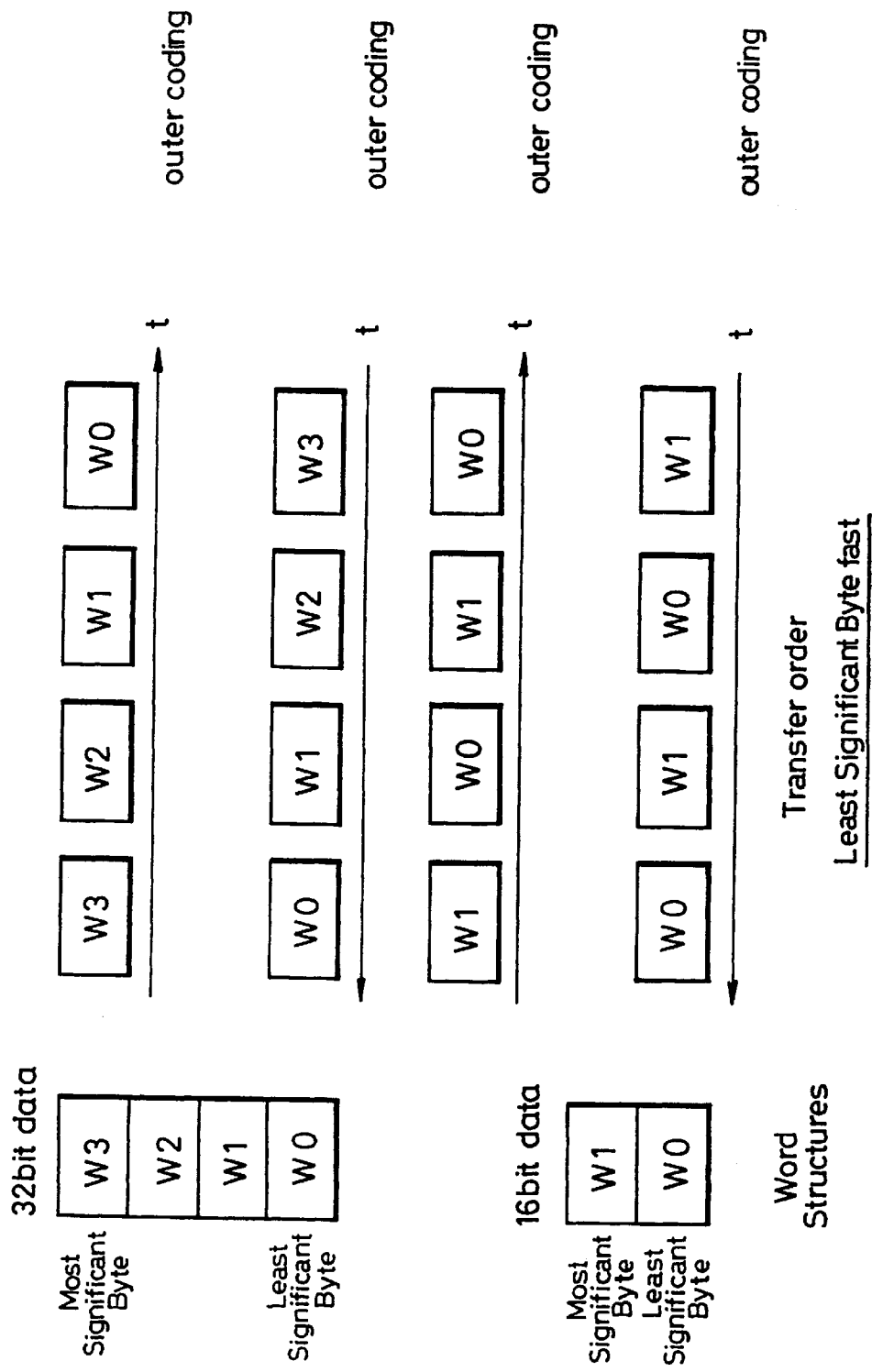
FIG. 18 is a schematic diagram used to explain the order to handle data according to the embodiment of the present invention.

The order for handling data will be described with reference to FIG. 18. FIG. 18 is a schematic diagram used to explain the order of handling data.

Data is handled in the byte serial order a shown in FIG. 18. The reverse areas in the management table are formed of only "0"s (hexadecimal notation). A write retry is not carried out in the area of the management table.

Figure 19:
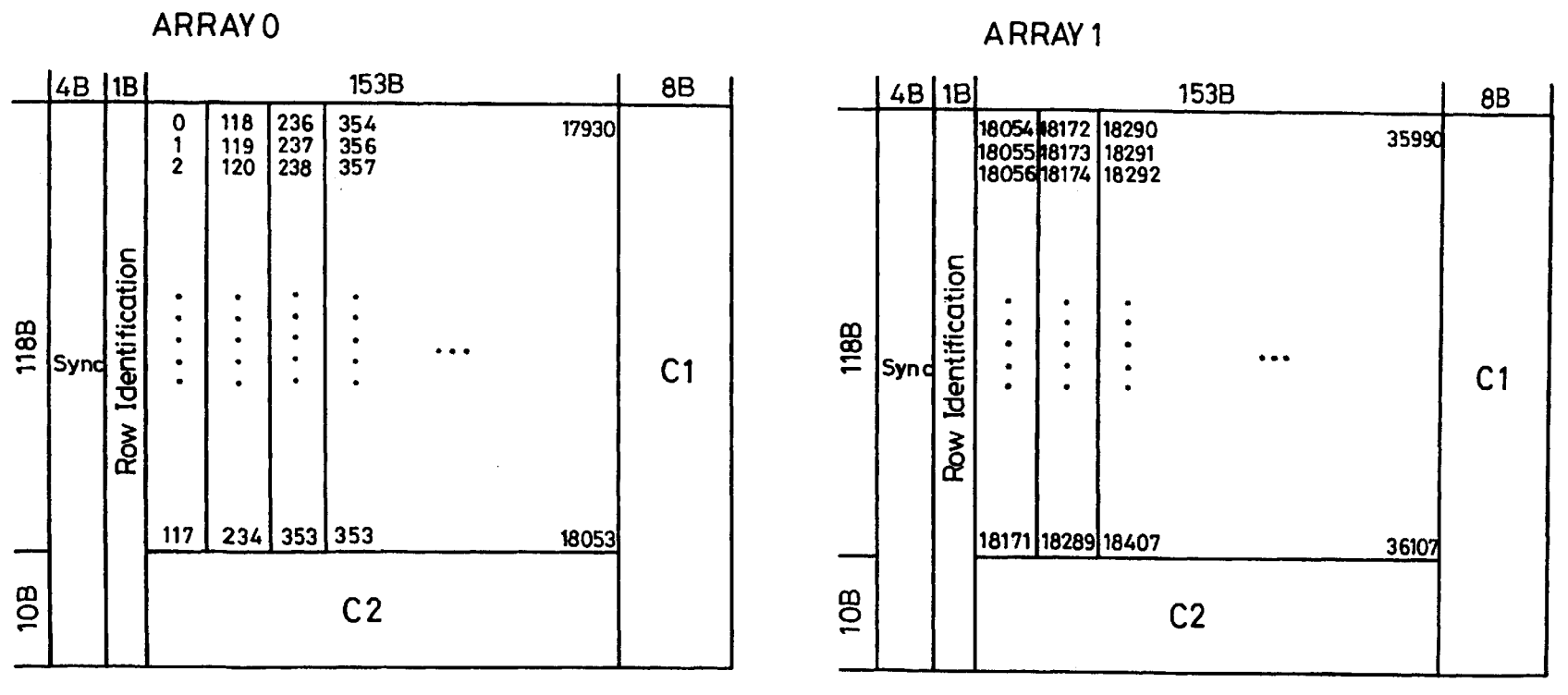

Error correction will be described with reference to FIG. 19. FIG. 19 is a schematic diagram used to explain error correction.

As shown in FIG. 19, data of data track is arranged to a product code with an outer code error-correction code C1 and an inner code error-correction code C2 added thereto.

The VSIT table will be described with reference to FIG. 10. FIG. 20 is an explanatory diagram showing a specific example of the VSIT table.

As shown in FIG. 20, a word W44 has a physical track set ID of the first data block in this physical volume assigned thereto. A word W45 has a physical track set ID of the last data block in this physical volume assigned thereto. This word W45 becomes the physical track set ID of EOD of the user area.

A word W62 has a number of VIT entries that follow. A word W65 has a physical track set ID of VIT #1.

The VSIT subcode is shown in FIG. 21. As shown in FIG. 21, a word W0 has a VSIT identification assigned thereto and a word W1 has a Byte count in track. A word W6 has a Logical track set ID (increment) assigned thereto. A word W24 has a CheckSUM assigned thereto. The checkSum is the data indicating an added result of the words W0 to W23. Informations of W0 of the following subcodes are all IDs and the SCSI formatter 55 can detect the kind of data having the corresponding ID by detecting the ID.

The "Byte count in track" assigned to W1 becomes data indicating "512 bytes" in the case of user data. The "Byte count in track" becomes "0" in the case of TM and Dummy which will be described later on.

The subcode will be described below. The least significant bits "B" of W2 of subcode is a block operation enable flag. When the block operation enable flag is "0", operation is disenabled, i.e., parameters of W2, W3, W4 are invalid. When the block operation enable flag is "1", operation is enabled, i.e., T. B. D. The most significant bit "A" is an append file pointer and the first appended track set ID is flagged.

The most significant bit "W" of the word W7 is a write retry counter operation enable flag. When the write retry counter operation enable flag is "0", the write retry counter is disenabled, i.e., the write retry counter of W7 is set to (0)16. When the write retry counter operation enable flag is "1", the write retry counter is enabled, i.e., when the write retry occurs in this track, the write retry counter of W7 is incremented. Words W8 to W23 are reserved and shall be recorded with "0".

The dummy track subcode will be described with reference to FIG. 22. FIG. 22 is an explanatory diagram showing a specific example of the dummy track subcode.

The dummy track shall be recorded with the area when a continuous control track is required. A user data area of the track is not determined. As shown in FIG. 22, a logical ID is assigned to W6 of the dummy track subcode. The VSIT table is ended when the dummy data track is continued more than 16 track set ID.

The EOD subcode will be described with reference to FIG. 23. FIG. 23 is an explanatory diagram showing a specific example of the EOD subcode.

The EOD is a track which indicates the end of recorded data. When the EOD indicates the end of recorded data, the EOD has to be continued more than 16 track set ID. An EOD identification is assigned to W0. A byte count in track, i.e., data indicative of valid data number is assigned to W1. A track number in this block is assigned to W2. W3 to W5 are set to all "1"s. A logical track set ID (not increment) is assigned to W6, W24 is a checkSUM. The BST is recorded on the user data area of the track.

As described above, the BST is registered on the EOD and then the EOD is recorded on the magnetic tape 66. The BST registered at that time becomes the BST of the same content as that of BST which will be described later on with reference to FIG. 28.

A subcode parameter will be described with reference to FIG. 24. Specifically, parameters of subcodes of the EOD and the dummy code are set as shown in FIG. 24.

The VIT will be described with reference to FIGS. 25 and 26. FIGS. 25 and 26 are explanatory diagrams showing specific examples of the VIT.

As illustrated, volume labels are assigned to the words W4 to W43.

A track set ID of the first data block in this volume segment on this physical volume is assigned to the word W44. This is the first physical track set ID No. of the data area of the volume managed by this table of the volume label and physical volume (tape).

A track set ID of the last data block in this volume segment on this physical volume is assigned to the word W45. This is the last physical track set ID No. of the data of the data area of the volume managed by this table in this physical volume (tape), and indicates the position of the EOD.

A number of entries in file information table, i.e., data indicating the number of tape marks registered on the FIT is assigned to a word W62.

A number of track sets in file information table, i.e., data indicating the number of track sets used by the FIT is assigned to a word W63. A UIT table type, i.e., data indicating the type of the first UIT is assigned to a word W64. As shown in FIG. 26, the first indicates the UIT. When "00000000" (hexadecimal notation), UIT is not used. When "00000000" (hexadecimal notation), to "7FFFFFFF" (hexadecimal notation), reserved; and when "80000000" (hexadecimal notation) to "FFFFFFFF" (hexadecimal notation), vender unique.

An overwrite count is assigned to a word W255, and an initialize number is assigned to a word 256.

The VIT subcode will be described with reference to FIG. 27. FIG. 27 is an explanatory diagram showing a specific example of the VIT subcode.

As shown in FIG. 27, a VIT identification is assigned to a word W0, and a byte count in track is assigned to a word W1. A track number in this block is assigned to a word W2. Words W3 to W5 are all ls. A logical track set ID (increment) is assigned to a word W6. A checkSUM is assigned to a word W24.

The BST will be described with reference to FIG. 28. FIG. 28 is an explanatory diagram showing a specific example of the BST.

As earlier noted, the BST is the table serving as management information including information indicative of invalid data area. Accordingly, the BST includes the whole of DIT which is management information provided at the tape top. The BST is the table used to manage logical invalid data generated in the write retry operation and the append write operation or the like. As earlier described with reference to FIG. 8, when data "B" having the same logical track set ID as that of certain data "A" is written after the data "A", the data "A" that makes the reading invalid is referred to as "invalid data".

There is provided the first physical track set ID number of the invalid data area. The most significant bit "E" indicates the cause in which data becomes invalid. In this case, when data becomes invalid due to error, "1" (hexadecimal notation) is set. When data becomes invalid due to causes other than error, "0" (hexadecimal notation) is set. Similarly, there is provided the last physical track set ID number of the invalid data area.

A #1 bad spot start track set ID (physical) is assigned to a word S192. A #1 bad spot end track set ID (physical) is assigned to a word S193. Similarly, pairs of bad spot start set ID and bad spot end track set ID will be assigned to the following words.

The BST subcode uses the same VIT subtable as that of the VIT as shown in FIG. 17.

The FIT and the FIT subcode will be described with reference to FIGS. 29 and 30. FIG. 29 is a diagram showing a specific example of the FIT, and FIG. 30 is a diagram showing a specific example of the FIT subcode.

As shown in FIG. 29, a #1 TM track set ID (physical) is assigned to a word W0, and a #2 TM track set ID (physical) is assigned to a word W2. A #N TM track set ID (physical), i.e., TM absolute block number is assigned to a word 2N-2.

As shown in FIG. 30, data in the FIT subcode will be assigned as follows.

As shown in FIG. 30, an FIT identification is assigned to a word W0, and a byte count in track, i.e., data indicating the number of valid data is assigned to a word W1. A track number in this block is assigned to a word W2, and words W3 to W5 are all ls.

A logical track set ID (increment) is assigned to a word W6, and a checkSUM is assigned to a word W24.

The UIT subcode will be described with reference to FIG. 31. FIG. 31 is an explanatory diagram showing a specific example of the UIT subcode.

As shown in FIG. 31, a UIT identification is assigned to a word W0, and a byte count in track, i.e., data indicative of the number of valid data is assigned to a word W1. A track number in this block is assigned to a word W2.

Words W3 to W5 are all ls. A logical track set ID (increment) is assigned to a word W6. A checkSUM is assigned to a word W24.

The UT will be described with reference to FIG. 32. FIG. 32 is an explanatory diagram showing a specific example of the UT.

As shown in FIG. 32, the UT is the table indicating whether or not the belonging table is being updated. An update status, i.e., data indicating whether or not the table is being updated is assigned to a word W0. When the update status is "00000000" (hexadecimal notation), the table is already updated (recording is ended). When the update status is "FFFFFFFF" (hexadecimal notation), the table is being updated (during recording).

The UT subcode will be described with reference to FIG. 33. FIG. 33 is an explanatory diagram showing a specific example of the UT subcode.

As shown in FIG. 33, a UT identification is assigned to a word W0, and a byte count in track, i.e., data indicating the number of valid data is assigned to a word W1. A track number in this block is assigned to a word W2.

Words W3 to W5 are all ls. A logical track set ID (increment) is assigned to a word W6 and a checkSUM is assigned to a word W24.

The checkSUM will be described with reference to FIG. 34. FIG. 34 is an explanatory diagram showing a specific example of the checkSUM.

Only the user data area in the logical tracks which are the VSIT and UT areas should be calculated, i.e., 4 bytes to 1 word should be calculated. The checkSUM should be calculated in a range of from W0 to W23, i.e., calculated at the unit of 4 bytes to 1 word.

CheckSUM data, i.e., data serving as the above-mentioned calculated result in assigned to a word W0.

The checkSUM subcode will be described with reference to FIG. 35. FIG. 35 is an explanatory diagram showing a specific example of the checkSUM subcode.

A checkSUM identification is assigned to a word W0, and a byte count in track, i.e., data indicating the number of valid data is assigned to a word W1. A track number in this block is assigned to a word W2.

Words W3 to W5 are all 1s. A logical track set ID (increment) is assigned to a word W6, and a checkSUM is assigned to a word W24.

The subcode parameters will be described below with reference to FIG. 36. FIG. 36 is an explanatory diagram showing specific examples of subcode parameters of tracks VSIT, VIT, FIT and UT. The subcode parameters of tracks of these VSIT, VIT, FIT and UT are illustrated in FIG. 36.

The user data subcode will be described with reference to FIG. 37. FIG. 37 is an explanatory diagram showing a specific example of the user data subcode.

The user data track is a track in which user data up to "32768 bytes" can be recorded in the user area.

A user identification (user identification) is assigned to W0, and a byte count in track, i.e., data indicating the number of valid data is assigned to a word W1. A track number in this block is assigned to a word W2.

An absolute block # is assigned to a word W3, a block # in file is assigned to a word W4, and a file number is assigned to a word W5. A logical track set ID (increment) is assigned to a word W6.

A write retry count is assigned to a word W7, an overwrite count is assigned to a word W22, and an initialize number is assigned to a word W23. A checkSUM is assigned to a word W24.

The TM subcode will be described with reference to FIG. 38. FIG. 38 is an explanatory diagram showing a specific example of the TM subcode.

The TM track is used as a separator for separating the adjacent two files as earlier noted. The TM uses logical ID of "1" and physical ID of "1". The USER data area of the track is not determined.

A TM identification is assigned to a word W0. A word W1 is set to all "0"s. A track number in this block is assigned to a word.

An absolute block # is assigned to a word W3, a block # file is assigned to a word W4, an a file number is assigned to a word W5. A logical track set ID (increment) is assigned to a word W6.

A write retry count is assigned to a word W7, and a checkSUM is assigned to a word W24.

All subcodes will be summarized with reference to FIG. 39. FIG. 39 is a diagram used to summarize all subcodes.

In the table track and the data track, IDs of VSIT, VIT, FIT, UT, checkSUM, USER, TM, EOD and DM are assigned to a word W0. In the VSIT, VIT, FIT, UT, checkSUM of table track and user in data track, byte count in track, i.e., data indicating the number of valid data is assigned to a word W1. In the table track and the data track, a track number in this block is assigned to a word W2.

In the EOD and DM of the table track and the data track, words W3 to W5 are set to all "1"s. A logical track set ID (increment), i.e., IDs of VSIT, VIT, FIT, UT, checkSUM, USER and TM in the table track and the data track are assigned to a word W6. Each checkSUM is assigned to a word 24.

In the TM of the data track, a word W0 is set to all "0"s. A byte count in track, i.e., data indicating the number of valid data is assigned to a word W0 of EOD and a word W0 of DM.

In the USER and TM of the data track, an absolute block # is assigned to a word W3, a block # in file is assigned to a word W4, and a file number is assigned to a word W5.

In the EOD and DM of the data track a logical track se ID (no increment) is assigned to a word W6. In the USER, TM, EOD and DM, a write retry count is assigned to a word W7.

Subcode parameters of user data and TM track will be described with reference to FIG. 40. FIG. 40 is an explanatory diagram showing specific examples of subcode parameters of user data and TM track.

The subcode parameters of user data and TM track are illustrated in FIG. 40.

As described above, according to the embodiment of this present invention, if the BS occurs when data is written, the BST is updated and written in the track EOD indicating the end position of data. Upon recovery operation, it is possible to obtain the BST serving as information indicating invalid data area by searching only the track EOD indicating the end position of data.

According to the embodiment of the present invention, when the BST registered in the DIT of the tape start portion made based on this format cannot be read in, it is possible to reconstruct the DIT of this format on the basis of the BST serving as information indicating the position of BS and the TM indicating the end position of each file.

According to the embodiment of the present invention, since the BST provided on the DIT of the tape start portion made on the basis of this format and the BST is updated in the presence of BS each time data is written, even if the DIT cannot be read in, it is possible to reconstruct the DIT with ease.

According to the embodiment of the present invention, when the tape is unloaded, the updated DIT is recorded on the tape start portion and the BST is registered to the EOD. Thus, even if the DIT cannot be read in, it is possible to reconstruct the DIT with ease.

According to the embodiment of the present invention, upon recovery operation, it is possible to considerably lower the probability that the EOD will be recognized erroneously. Further, when the subcode of the EOD is read out, it is possible to detect the EOD immediately. Thus, it is possible to reconstruct the DIT without reading the magnetic tape up to its physical tape end. Therefore, it is possible to reduce a time required by the recovery operation.

Further, as shown in FIG. 26, the overwrite counter and the initialize number are provided in the VIT in the DIT which is the header portion of the file format as the two subcodes added to the subcode. In this case, the final values of the overwrite counter and the initialize number are recorded as two parameters. This area is the area that is read in first when the magnetic tape is used. Therefore, it is possible to reset the previous two parameters at the same time when this area is read in first.

At the same time when the magnetic tape is loaded, the VSIT and the DIT serving as headers are read out and the data from the host computer is written on the magnetic tape on the basis of the directory information recorded on the magnetic tape or data recorded on the magnetic tape is sent back to the host computer. When the magnetic tape is unloaded, latest management information is written in the DIT and the magnetic tape is ejected.

Before the magnetic tape is ejected, the values of the latest overwrite counter and initialize number are preserved as one parameter in the DIT. Then, when the magnetic tape is loaded, the DIT is read out and simultaneously, the overwrite counter and the initialize number used to write data in the magnetic tape are set in the memory.

It is possible to carry out the implementation by simplifying the algorithm for updating the overwrite counter and the initialize number serving as the two parameters.

Specifically, the overwrite counter is updated at the timing which follows. That is, when the magnetic tape is initialized, the overwrite counter is set to "0". Then, when the file is overwritten not from the end of data but from somewhere of the data, the overwrite counter is incremented. When the file is added to the EOD, the overwrite counter is not incremented. The overwrite counter can be directly substituted into the subcode as a constant.

As shown in FIG. 40, the written value of the overwrite counter is returned to "0" when the magnetic tape is initialized. When that value is written in the DIT and the magnetic tape is loaded, that value is simply incremented from "0" to "1", "2", . . . , and written in the subcode. Then, when the magnetic tape is unloaded, the remaining overwrite counter is written in the DIT.

A timing at which the initialize number is updated will be described below. As shown in FIG. 40, when the magnetic tape is initialized, a random number is generated and the initialize number can be directly substituted into the subcode as a constant until the magnetic tape is initialized next. The random number that was generated when the magnetic tape is initialized is written in the DIT. Then, the value of the initialize number is written in the subcode when the magnetic tape is loaded. This value is never updated at a timing other than the timing used when the magnetic tape is initialized. Then, the initialize number used when the magnetic tape is initialized is written in the DIT.

It is possible to add the overwrite counter and the initialize number to the subcode as two parameters. Thus, the overwrite counter simply increments the value each time the overwrite counter overwrites data. Therefore, if the user data that is not overwritten yet is read in when the EOD is detected upon recovery operation, that value should be a decreased value. It is possible to detect the position of the EOD.

Since a unique number is assigned to the initialize number each time the magnetic tape is initialized, if the subcode of the user data written after the previous initialization is read in when the EOD is detected upon recovery operation, then such initialize number and the present initialize number are not agreed with each other. Therefore, it is possible to detect the position of the EOD.

The value of the initialize number is set to a random number generated from a random number generator. In this case, the number of the previously-set initialize number is not checked. However, each time the magnetic tape is initialized, a random number of digits in which the same value is prevented from being produced sufficiently is generated and the value of such random number is utilized as the initialize number.

As the random number generator, it is possible to use a timer which is activated when the recording and reproducing system is energized. If the initialize number is set to a unique number based on the random number, then it is possible to remove a cumbersome work for checking the previous values when the magnetic tape is initialized. Also, it is possible to remove the increase of operation required when a virgin tape and the old tape used more than one time are distinguished. Therefore, it is possible to simplify the initialization procedure.

In the aforesaid embodiment, when the magnetic tape is loaded, the DIT including the BST provided at the tape start portion made based on this format may be read in and the DIT may be updated each time data is written.

Further, in the aforesaid embodiment, when the magnetic tape is unloaded, the BST provided in the DIT of the tape start portion made based on this format may be written in the tracks of the DIT of the tape start portion and the EOD indicating the end position of the data.

While the EOD is written in the BST as described above, the present invention is not limited thereto and other information of VIT may be written in the EOD.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A recording and reproducing apparatus operable with a host computer for recording to a tape recording medium and reproducing therefrom data comprising:

recording and reproducing means responsive to commands of said host computer for recording data on said tape recording medium and reproducing said data therefrom;

invalid area detecting means for detecting an invalid area on said tape recording medium unable to normally record data during recording;

bank memory means for storing said data to be recorded;

control means for causing said recording and reproducing means to record initial information including a data information table initially on said tape recording medium, and to record end of data information following said data on said tape recording medium, wherein said control means causes an invalid area position of said invalid area detected by said invalid area detecting means to be recorded with said end of data information when said bank memory means is not filled to capacity and said host computer does not issue and more commands to said recording and reproducing means;

updating means for updating said data information table to include said invalid area position upon an unloading operation of said tape recording medium; and recovery means for extracting said invalid area position from said end of data information and updating said data information table after a loading operation of said tape recording medium in the event said updating previously performed during an unloading operation was interrupted.

2. The recording and reproducing apparatus of claim 1, wherein said control means causes said recording and reproducing means to record a recording flag along with said initial information on said tape recording medium during recording.

3. The recording and reproducing apparatus of claim 2, wherein said recovery means extracts said invalid area position when said recording flag is present on said tape recording medium upon said loading operation of said tape recording medium.

4. The recording and reproducing apparatus of claim 1, wherein said control means causes said recording and reproducing means to record logical identification numbers on said tape recording medium adjacent said data indicating a logical position of said data along said tape recording medium.

5. The recording and reproducing apparatus of claim 4, wherein said control means causes said recording and reproducing means to skip over said invalid area to a subsequent position on said tape recording medium and repeat a logical identification number for said subsequent position.

6. A recording and reproducing method operable with a host computer for recording to a tape recording medium and reproducing therefrom data comprising the steps of:

recording data on said tape recording medium and reproducing said data therefrom in response to commands of said host computer;

detecting an invalid area on said tape recording medium unable to normally record the data during recording;

bank memory means for storing data to be recorded;

controlling said recording to record initial information including a data information table initially on said tape recording medium;

controlling said recording to record said data after said initial information is recorded;

controlling said recording to record end of data information following said data on said tape recording medium including an invalid area position of said detected invalid area when said bank memory means is not filled to capacity and said host computer does not issue any more commands to said recording and reproducing means;

updating said data information table to include said invalid area position upon an unloading operation of said tape recording medium; and recovering said invalid area position from said end of data information and updating said data information table after a loading operation of said tape recording medium in the event said updating step previously performed during an unloading operation was interrupted.

7. The recording and reproducing method of claim 6, further comprising recording a recording flag along with said initial information on said tape recording medium.

8. The recording and reproducing method of claim 7, wherein said recovering step extracts said invalid area position when said recording flag is present on said tape recording medium upon said loading operating of said tape recording medium.

9. The recording and reproducing method of claim 6 further comprising recording logical identification numbers on said tape recording medium adjacent said data for indicating a logical position of said data along said tape recording medium.

10. The recording and reproducing method of claim 9 wherein said step of recording logical identification numbers further comprises skipping over said invalid area to a subsequent position on said tape recording medium and repeating a logical identification number for said subsequent position.

* * * * *